(12) United States Patent
Zhou et al.

(10) Patent No.: US 11,828,382 B2
(45) Date of Patent: Nov. 28, 2023

(54) INDICATOR ASSEMBLY

(71) Applicant: FISHER JEON GAS EQUIPMENT (CHENGDU) CO., LTD., Chengdu (CN)

(72) Inventors: Biao Zhou, Chengdu (CN); Yanwei Lei, Chengdu (CN); Dan Liu, Chengdu (CN); Chongyang Xiao, Chengdu (CN)

(73) Assignee: FISHER JEON GAS EQUIPMENT (CHENGDU) CO., LTD., Chengdu (CN)

( * ) Notice: Subject to any disclaimer, the term of this patent is extended or adjusted under 35 U.S.C. 154(b) by 0 days.

(21) Appl. No.: 17/050,798

(22) PCT Filed: Apr. 26, 2019

(86) PCT No.: PCT/CN2019/084464
§ 371 (c)(1),
(2) Date: Oct. 26, 2020

(87) PCT Pub. No.: WO2019/206257
PCT Pub. Date: Oct. 31, 2019

(65) Prior Publication Data
US 2021/0123542 A1    Apr. 29, 2021

(30) Foreign Application Priority Data

Apr. 27, 2018   (CN) .......................... 201820690014.4
Jul. 1, 2019    (CN) .......................... 201910012722.1
Jul. 1, 2019    (CN) .......................... 201920021278.5

(51) Int. Cl.
*F16K 37/00*      (2006.01)
*F16K 3/24*       (2006.01)

(52) U.S. Cl.
CPC ............ *F16K 37/0016* (2013.01); *F16K 3/24* (2013.01)

(58) Field of Classification Search
CPC .... F16K 37/0016; F16K 37/0008; F16K 3/24; Y10T 137/8225; Y10T 137/8275
See application file for complete search history.

(56) References Cited

U.S. PATENT DOCUMENTS 1,514,975 A * 11/1924 Larner ................. G05D 7/0153
                                                         137/220
2,357,059 A    8/1944 Ray
(Continued)

FOREIGN PATENT DOCUMENTS

| CN | 103047476 | 4/2013 |
| CN | 104712799 | 6/2015 |

(Continued)

OTHER PUBLICATIONS

International Search Report and Written Opinion for Application No. PCT/CN2019/084464, dated Jul. 25, 2019.
(Continued)

*Primary Examiner* — Kenneeth Rinehart
*Assistant Examiner* — Nicole Gardner
(74) *Attorney, Agent, or Firm* — MARSHALL, GERSTEIN & BORUN LLP

(57) ABSTRACT

A regulator includes a valve body and a control element movable between a closed position, in which the control element engages a valve seat, and an open position, in which the control element is spaced away from the valve seat. A stem is operatively coupled to the control element and is axially aligned with a longitudinal axis of the valve body. An indicator assembly is at least partially disposed in the valve body and is operatively coupled to the stem. The indicator assembly includes a rod operatively coupled to the stem and an indicator operatively coupled to the rod. The indicator is arranged to display a position of the control element. The rod of the indicator assembly is movable by the stem between a first position when the control element is in the closed
(Continued)

position, and a second position when the control element is in the open position.

18 Claims, 16 Drawing Sheets

(56) References Cited

U.S. PATENT DOCUMENTS

| | | | |
|---|---|---|---|
| 3,566,907 A * | 3/1971 | Sime | F16K 37/0008 |
| | | | 137/553 |
| 4,375,789 A | 3/1983 | Bergeron | |
| 4,525,183 A | 6/1985 | Cordes et al. | |
| 4,622,994 A | 11/1986 | Rosaen | |
| 4,635,901 A * | 1/1987 | Pond | F16K 37/0008 |
| | | | 116/285 |
| 4,934,652 A | 6/1990 | Golden | |
| 6,152,173 A | 11/2000 | Makowan | |
| 6,397,892 B1 | 6/2002 | Pyle et al. | |
| 7,159,614 B2 | 1/2007 | Tiziani et al. | |
| 2016/0123492 A1 | 5/2016 | Tibben et al. | |

FOREIGN PATENT DOCUMENTS

| | | | |
|---|---|---|---|
| CN | 205078810 | 3/2016 | |
| CN | 205715871 | 11/2016 | |
| CN | 104747787 B | 3/2017 | |
| CN | 206958380 | 2/2018 | |
| CN | 208634500 | 3/2019 | |
| DE | 2617517 A1 | 11/1977 | |
| DE | 10 2005 009989 B3 | 6/2006 | |
| DE | 102005009989 B3 * | 6/2006 | ......... F16K 37/0008 |
| WO | WO-2012/112845 A1 | 8/2012 | |
| WO | WO-2017/041140 A1 | 3/2017 | |

OTHER PUBLICATIONS

International Search Report and Written Opinion for Application No. PCT/CN2019/084475, dated Aug. 1, 2019.
Extended European Search Report for EP 19 79 3438, dated Jan. 25, 2022.
Extended European Search Report and Opinion for corresponding European Patent Application No. 19793440.9 dated Jan. 4, 2022.
European Office Action, European Application No. 19793438.3, dated Apr. 19, 2023.

* cited by examiner

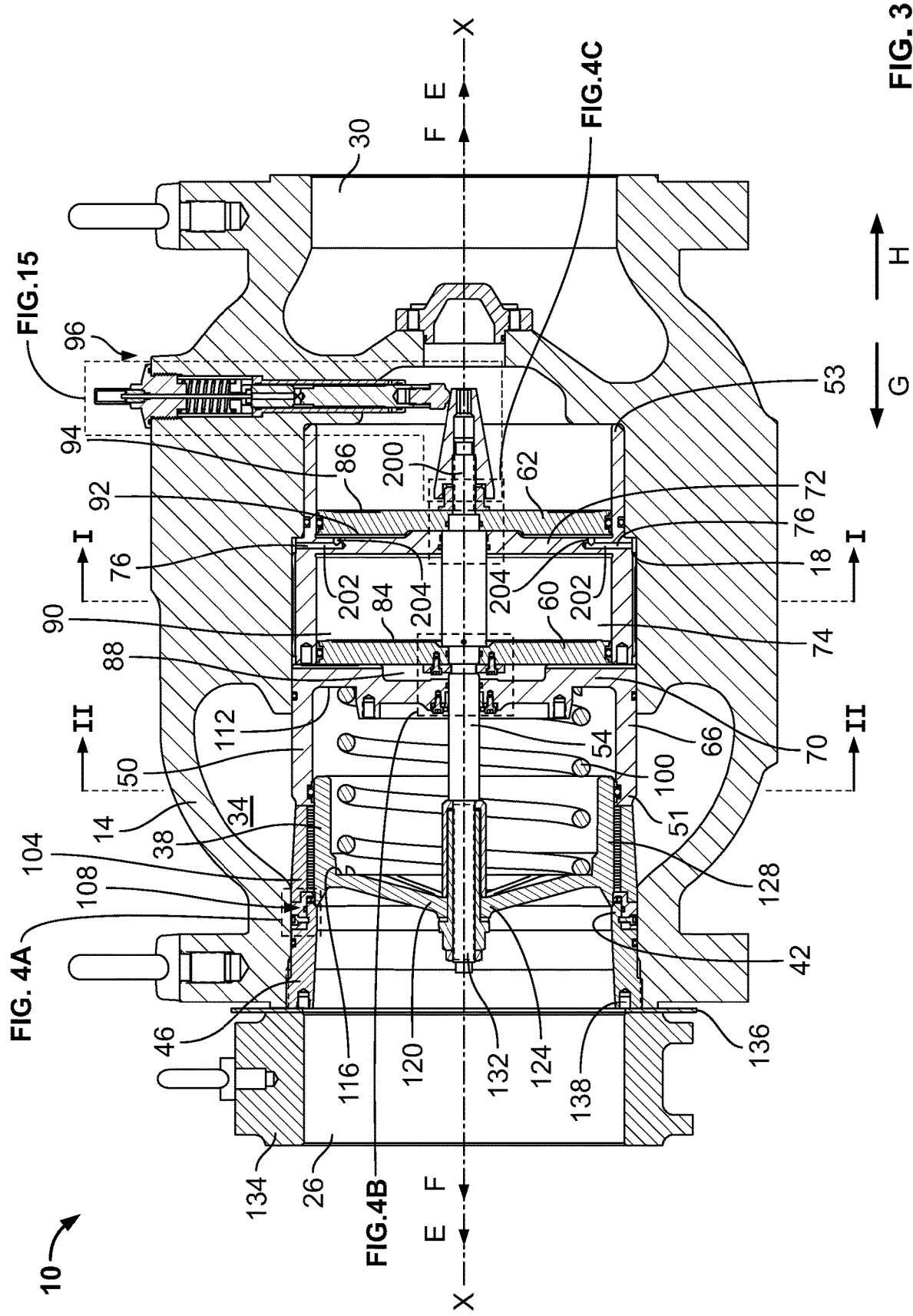

I-I

I-I

II-II

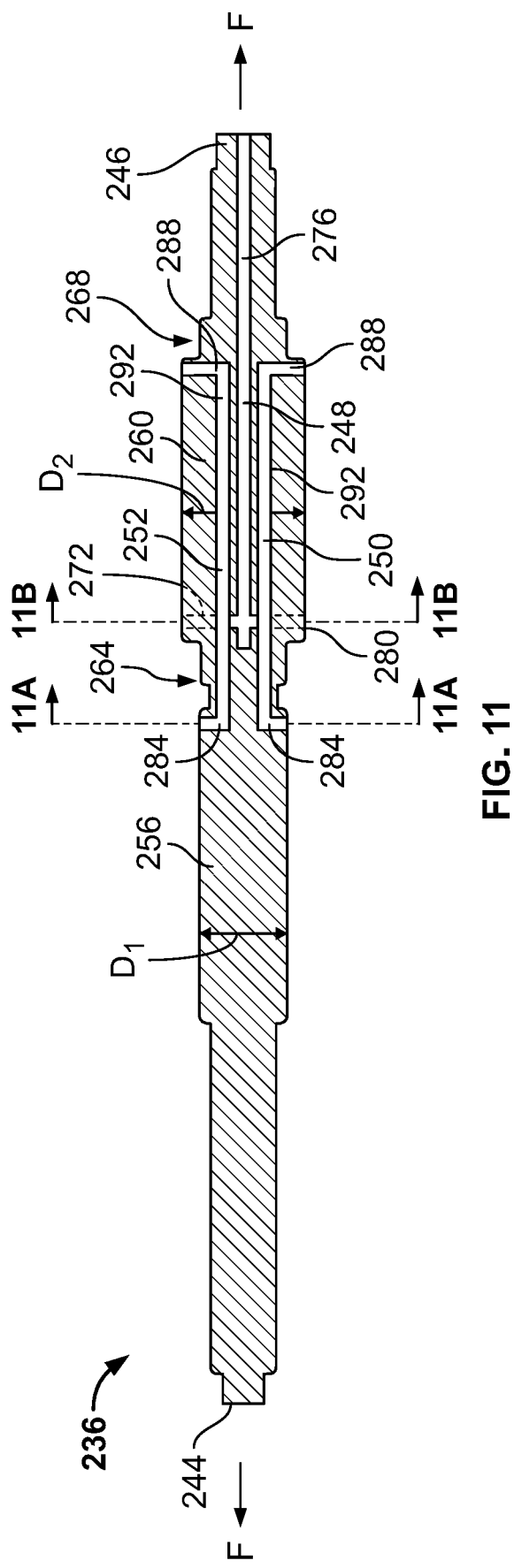

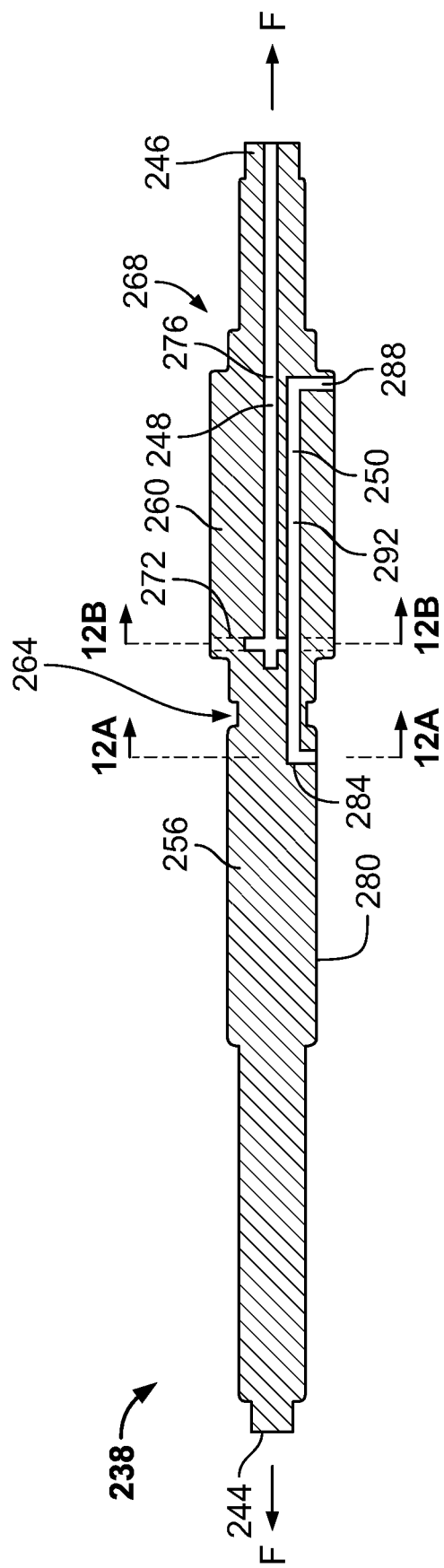
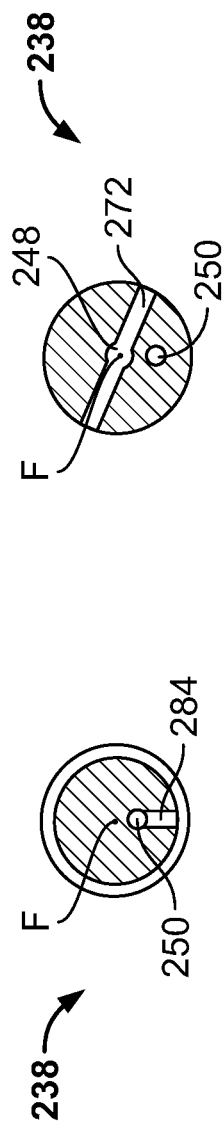
FIG. 12
FIG. 12B
FIG. 12A

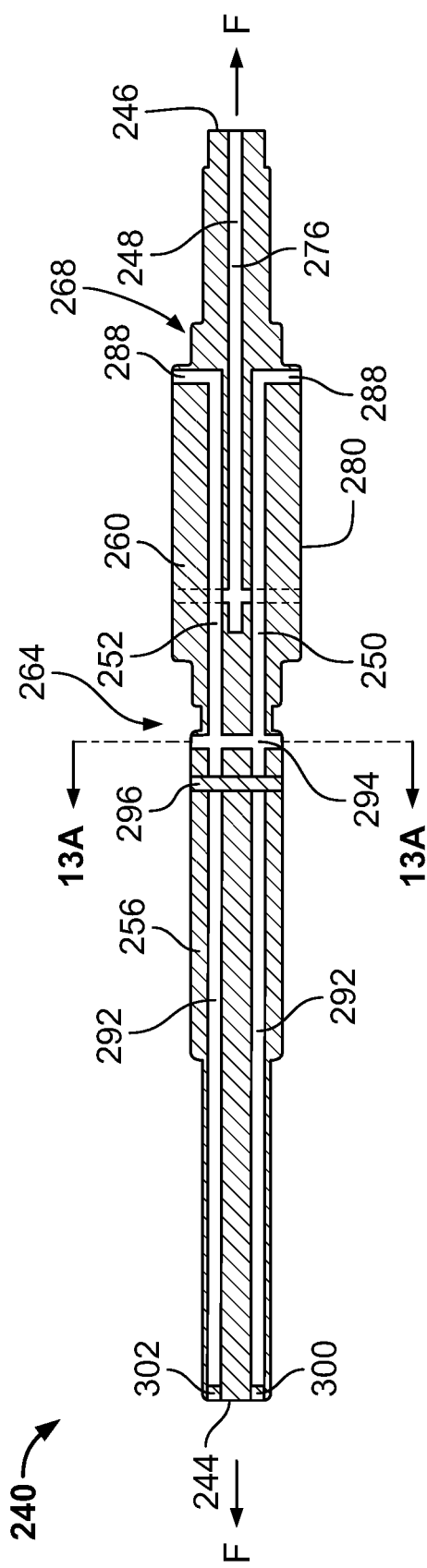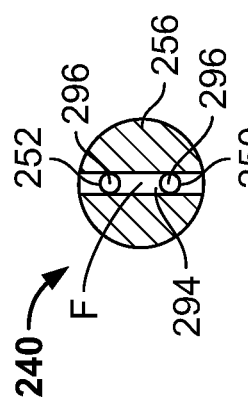
FIG. 13
FIG. 13A

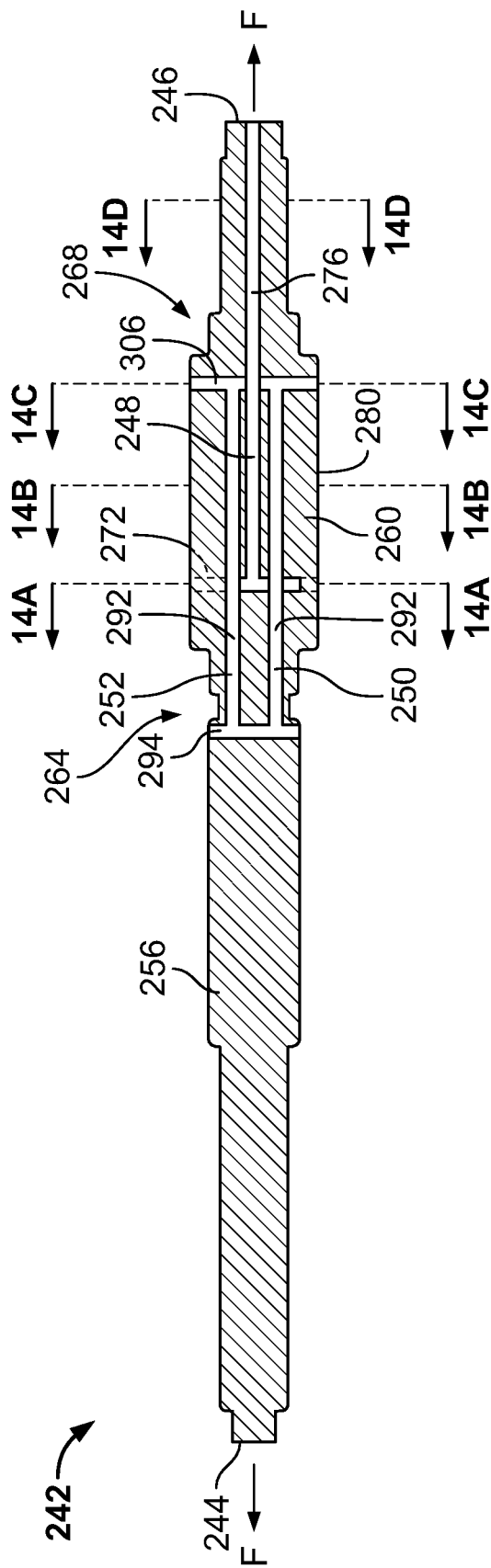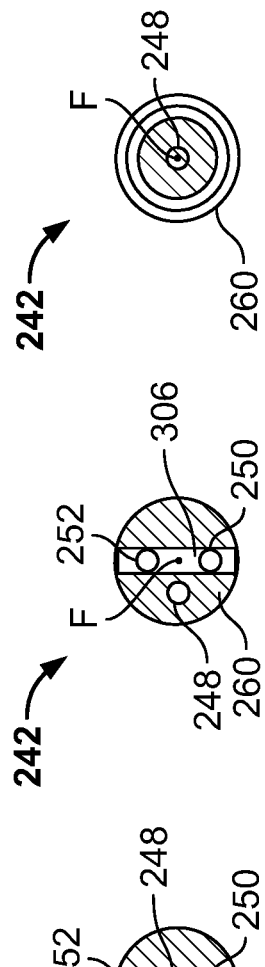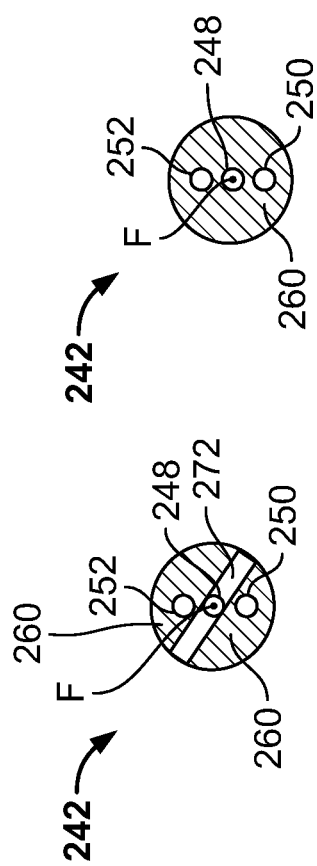
FIG. 14

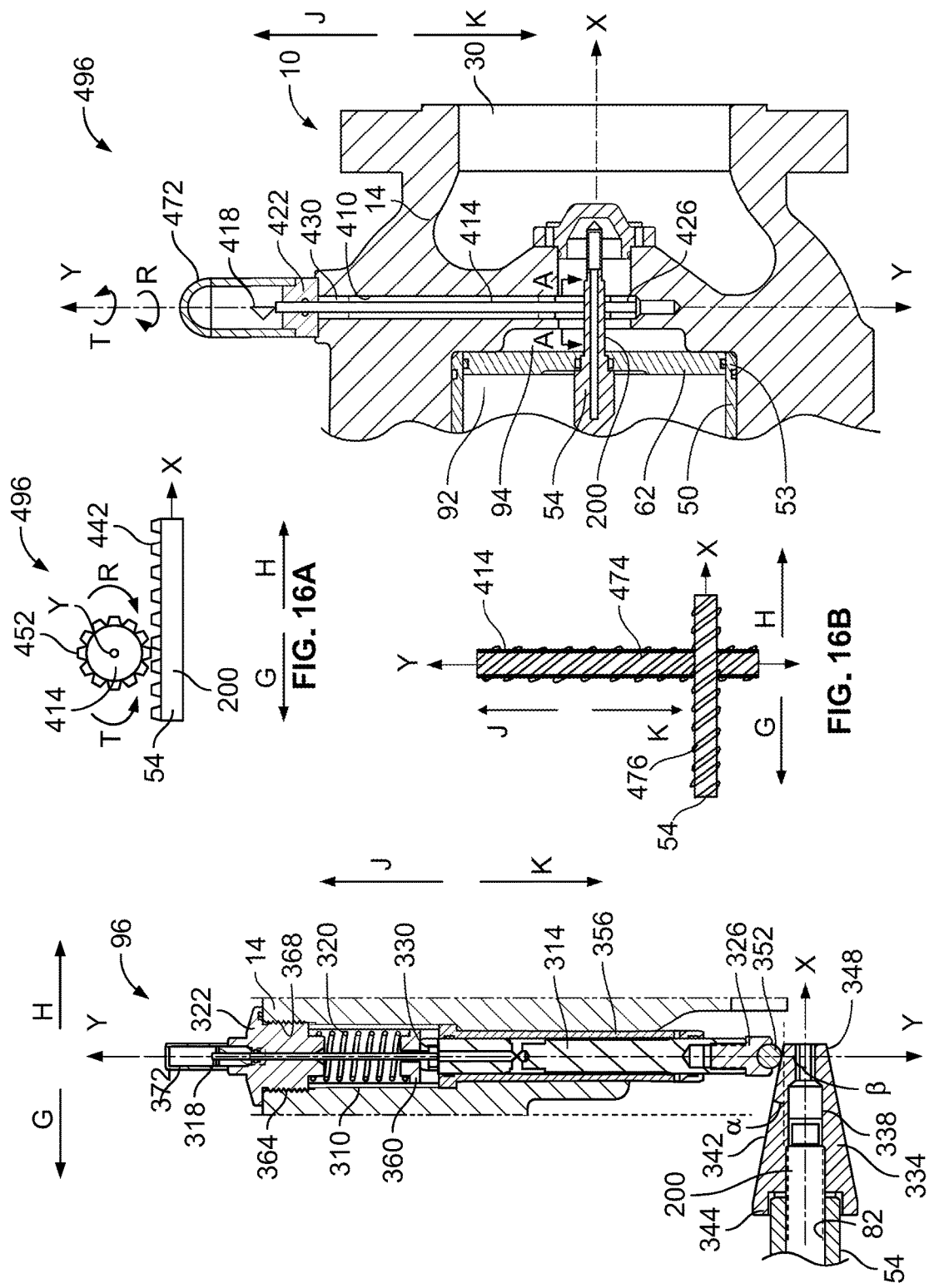

INDICATOR ASSEMBLY

FIELD OF DISCLOSURE

The present disclosure generally relates to a regulator, and, more particularly, to an indicator assembly for a regulator.

BACKGROUND

Industrial processing plants use pressure regulators in a wide variety of applications such as, for example, controlling fluid flow (e.g., gas, liquid) in a processing operation. A valve body of a conventional regulator valve is divided into several parts, which must be tightly secured together to maintain internal pressure of the regulator. The valve body requires a plurality of mounting flanges, flange bolts, and must be disassembled to access the internal components of the regulator for repair or replacement.

SUMMARY

In accordance with a first exemplary aspect, a fluid control device may include a valve body defining an inlet, an outlet, and a flow path connecting the inlet and the outlet. A control element may be movable along a longitudinal axis between the inlet and the outlet between a closed position, in which the control element engages a valve seat, and an open position, in which the control element is spaced away from the valve seat. A stem may be operatively coupled to the control element and axially aligned with the longitudinal axis. An indicator assembly may be at least partially disposed in a bore of the valve body along an indicator axis that is non-parallel with the longitudinal axis. Movement of the stem along the longitudinal axis may cause movement of a rod of the indicator assembly along or about the indicator axis to indicate a position of the control element.

In accordance with a second exemplary aspect, a fluid control device may include a valve body defining an inlet, an outlet, and a flow path connecting the inlet and the outlet. A control element may be movable along a longitudinal axis of the valve body between a closed position, in which the control element engages a valve seat, and an open position, in which the control element is spaced away from the valve seat. A stem may be operatively coupled to the control element and axially aligned with the longitudinal axis. An indicator assembly may be at least partially disposed in a bore of the valve body along an indicator axis that is non-parallel with the longitudinal axis. The indicator assembly may include a roller that is in contact with a conical cap connected to the stem. A rod may be coupled to the roller, and movement of the roller along the cap may cause movement of the rod along the indicator axis to indicate a position of the control element relative to the valve seat.

In accordance with a third exemplary aspect, an indicator assembly for use with a fluid control device may include a rod positioned at least partially within a body of the fluid control device along an indicator axis. At least one feature may be operatively coupled to the rod and operatively couplable to a stem of the fluid control device. The indicator assembly may be configured to convert the movement of the stem along a longitudinal axis that is non-parallel with the indicator axis into a movement along or about the indicator axis to indicate a position of a control element of the fluid control device.

In further accordance with any one or more of the foregoing first, second, or third exemplary aspects, a fluid control device and/or an indicator assembly for use with a fluid control device may further include any one or more of the following preferred forms.

In a preferred form, the indicator axis may be perpendicular to the longitudinal axis.

In a preferred form, the indicator assembly may include an indicator that is coupled to the rod and that is extendable outside of the valve body.

In a preferred form, the indicator assembly may include a plug coupled to the valve body.

In a preferred form, the indicator may be slidably coupled to the plug.

In a preferred form, the indicator may extend a first distance outside of the valve body when the control element is in the open position and may extend a second distance outside of the valve body when the control element is in the closed position.

In a preferred form, the first distance may be greater than the second distance.

In a preferred form, the indicator assembly may include a spring disposed between the plug and a spring seat carried by the rod.

In a preferred form, the spring may bias the rod toward the stem.

In a preferred form, a cap may be disposed at an end of the stem and may include a sloped surface.

In a preferred form, the cap may have a wide first end and a narrow second end.

In a preferred form, the first end of the cap may be in contact with the rod when the control element is in the open position, and the second end of the cap may be in contact with the rod when the control element is in the closed position.

In a preferred form, the indicator assembly may include a roller that contacts the cap.

In a preferred form, the indicator assembly may include a cord and a roller.

In a preferred form, the cord may be operatively coupled to the stem at a first end of the cord and operatively coupled to the rod at a second end of the cord.

In a preferred form, the cord and the roller may be configured to translate an axial movement of the stem to an axial movement of the rod.

In a preferred form, the indicator assembly may include an arm hingedly coupled to the stem and hingedly coupled to the rod.

In a preferred form, the arm may be configured to translate an axial movement of the stem to an axial movement of the rod.

In a preferred form, an axial movement of the stem may cause rotational movement of the rod.

In a preferred form, the stem may include a corrugated surface and the rod may include a corrugated surface rotatably coupled to the corrugated surface of the stem.

In a preferred form, when the stem moves in a direction parallel to the longitudinal axis of the valve body, the corrugated surface of the stem may engage the corrugated surface of the rod to rotate the rod about the indicator axis.

In a preferred form, the indicator assembly may include a spring that biases the roller towards the conical cap.

In a preferred form, an indicator may be coupled to the rod and that may be extendable outside of the body.

In a preferred form, the at least one feature may be configured to engage a cap disposed at an end of the stem and may have a sloped surface.

In a preferred form, the at least one feature may be positioned at a wide end of the cap when the control element is in a first position and at a narrow end of the cap when the control element is in a second position.

In a preferred form, the at least one feature may be a roller that contacts the cap.

In a preferred form, the at least one feature may include a cord and a roller.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

BRIEF DESCRIPTION OF THE DRAWINGS

FIG. 3 is a front cross-sectional view of the regulator of FIG. 1, showing the regulator in a closed position;

FIG. 11 is a cross-sectional view of a second exemplary stem assembled in accordance with the teachings of the present disclosure;

FIG. 11A is a cross-sectional view of the stem of FIG. 11 taken at A-A;

FIG. 11B is a cross-sectional view of the stem of FIG. 11 taken at B-B;

FIG. 12 is a cross-sectional view of a third exemplary stem assembled in accordance with the teachings of the present disclosure;

FIG. 12A is a cross-sectional view of the stem of FIG. 12 taken at A-A;

FIG. 12B is a cross-sectional view of the stem of FIG. 12 taken at B-B;

FIG. 13 is a cross-sectional view of a fourth exemplary stem assembled in accordance with the teachings of the present disclosure;

FIG. 13A is a cross-sectional view of the stem of FIG. 13 taken at A-A;

FIG. 14 is a cross-sectional view of a fifth exemplary stem assembled in accordance with the teachings of the present disclosure;

FIG. 14A is a cross-sectional view of the stem of FIG. 14 taken at A-A;

FIG. 14B is a cross-sectional view of the stem of FIG. 14 taken at B-B;

FIG. 14C is a cross-sectional view of the stem of FIG. 14 taken at C-C;

FIG. 14D is a cross-sectional view of the stem of FIG. 14 taken at D-D;

FIG. 15 is a magnified view of the regulator of FIG. 3, showing a first exemplary indicator assembly of the regulator of FIG. 1;

FIG. 16 is a partial, cross-sectional view of a second exemplary indicator assembly assembled in accordance with the teachings of the present disclosure, and disposed in the regulator of FIG. 1;

FIG. 16A is a partial, cross-sectional view of the indicator assembly of FIG. 16 taken at A-A;

FIG. 16B is a partial, side view of the indicator assembly of FIG. 16;

DETAILED DESCRIPTION

Figure 1:
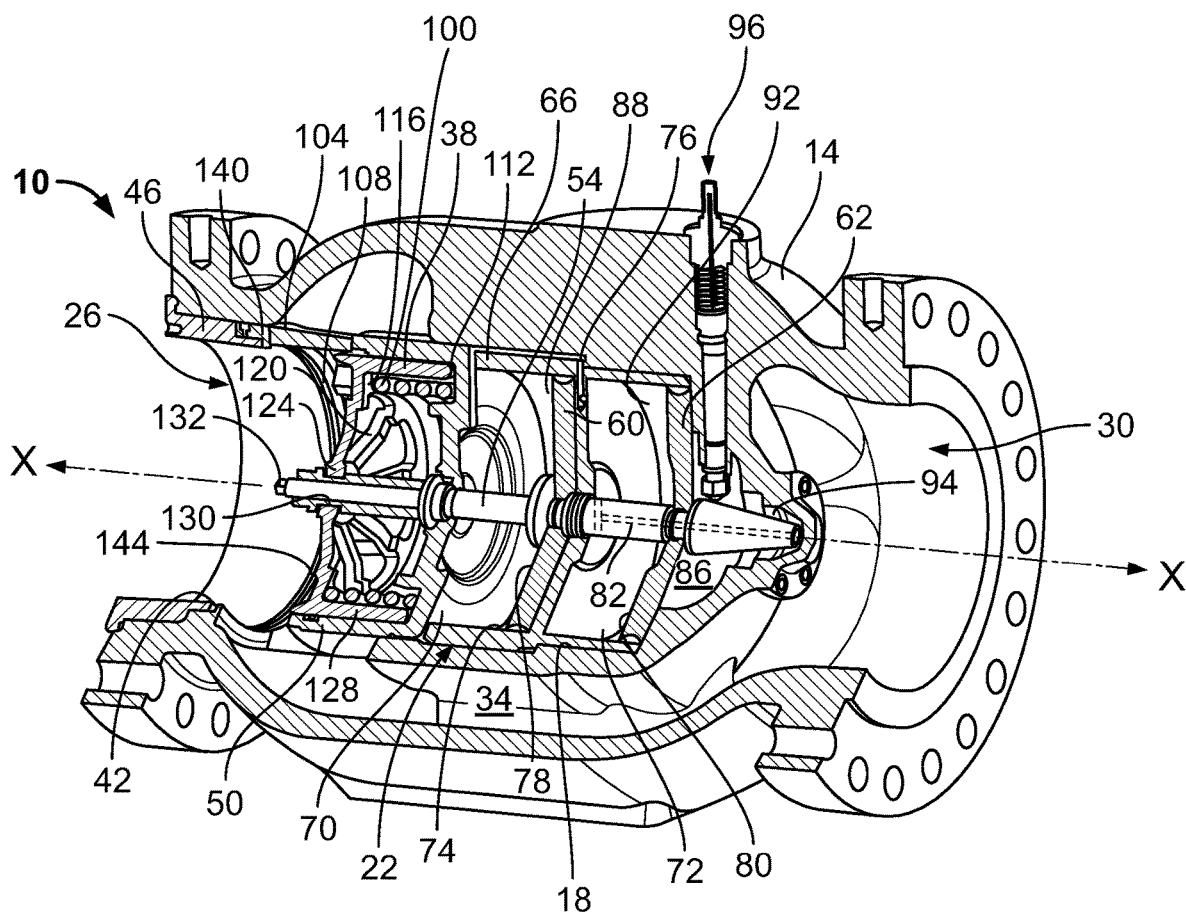
FIG. 1 is a perspective cross-sectional view of a regulator assembled in accordance with the teachings of the present disclosure, showing the regulator in a fully open position.
Figure 2:
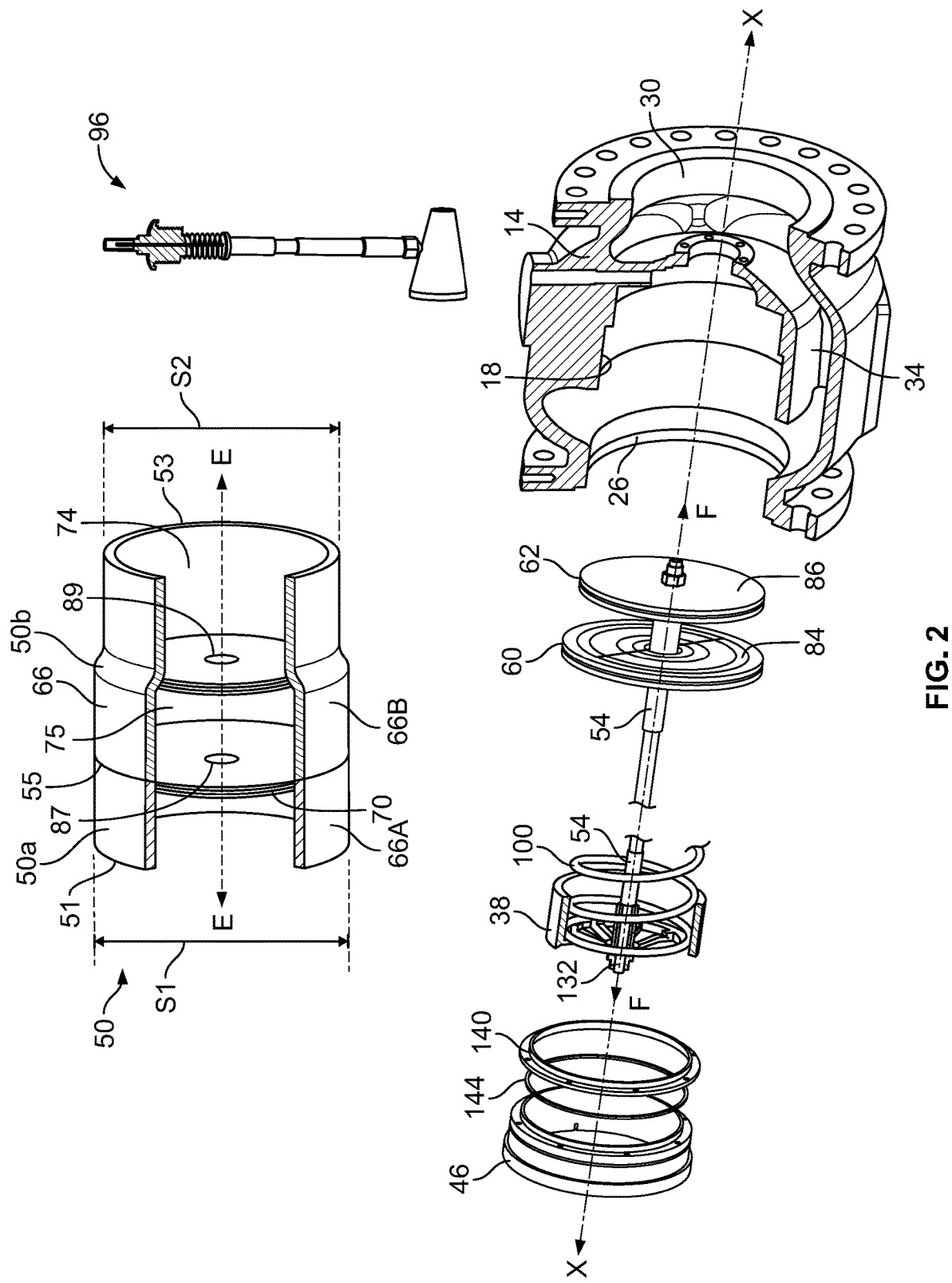
FIG. 2 is a partial, exploded, perspective cross-sectional view of the regulator of FIG. 1.

In FIGS. 1-3, an exemplary fluid regulator 10 is constructed according to the teachings of the present disclosure. The regulator 10 includes a valve body 14 having a central bore 18 and an actuator assembly 22 disposed in the bore 18. The valve body 14 defines an inlet 26, an outlet 30, and a flow path 34 connecting the inlet 26 and the outlet 30. The bore 18 formed in the valve body 14 is centered on a longitudinal axis X of the valve body 14, and the flow path 34 is peripherally disposed relative to the bore 18. A control element 38 is movable relative to the valve body 14 between a closed position (FIG. 3), in which the control element 38 engages a valve seat 42 disposed in the flow path 34, and an open position (FIG. 1), in which the control element 38 is spaced away from the valve seat 42. The actuator assembly 22 is operatively coupled to the control element 38 and is configured to move the control element 38 axially along the longitudinal axis X to open and close the regulator 10. An inlet fitting 46 is coupled to the valve body 14 at the inlet 26 and is configured to retain the actuator assembly 22 and the control element 38 within the bore 18 of the valve body 14. The inlet fitting 46 is removably coupled to the valve body 14. For example, external threads on the inlet fitting 46 may couple to internal threads in the inlet 26 of the valve body 14. Similarly, the inlet fitting 46 may be bolted to the inlet 26 of the valve body 14. Because the inlet fitting 46 is removable from the valve body 14, the internal components (e.g., the actuator assembly 22 and the control element 38) of the regulator 10 are insertable and removable through the inlet 26. However, in another example, the inlet 26 and the outlet 30 may be switched (i.e., such that fluid flows from the right to the left in FIGS. 1-3) in which case the internal components of the regulator 10 would be removably disposed through the outlet 30 of the valve body 14. In either example, the valve body 14 may be a single-cast (e.g., integrally formed) valve body 14.

The actuator assembly 22 includes a sleeve 50, a stem 54 extending through the sleeve 50, a first piston 60 coupled to the stem 54, and a second piston 62 coupled to the stem 54 and spaced away from the first piston 60. The sleeve 50, the stem 54, or both the sleeve 50 and the stem 54 provide pathways to permit internal fluid communication to actuate the actuator assembly 22. As shown in FIGS. 1 and 2, the sleeve 50 includes separable first and second sleeve portions 50a, 50b. The first sleeve portion 50a has a cylindrical wall 66a and a first plate 70 and the second sleeve portion 50b has a cylindrical wall 66b and a second plate 72. When the first and second sleeve portions 50a, 50b are positioned adjacent to each other as shown in FIG. 2, they collectively form the sleeve 50 in which the first plate 70 is spaced from the second plate 72. The cylindrical walls 66a, 66b (together forming a wall labeled as 66) and the first and second plates 70, 72 define a first cavity 75 in which the first piston 60 is slidably disposed, and a second cavity 74 in which the second piston 62 is slidably disposed. As shown in FIGS. 1 and 3, and described in more detail below, a pathway 76 is formed in the cylindrical wall 66 of the sleeve 50 to provide fluid communication between an upstream surface 78 of the first piston 60 and an upstream surface 80 of the second piston 62. Also described further below, the stem 54 includes a passage 82 (shown in dashed lines in FIG. 1) extending partially through the stem 54 that provides fluid communication between a downstream 84 surface of the first piston 60 and a downstream surface 86 of the second piston 62. As used herein, the term "upstream" refers to a side facing the inlet 26 (i.e., upstream of the flow path 34), and the term "downstream" refers to a side facing the outlet 30 (i.e., downstream the flow path 34).

As shown in FIG. 2, the internal components of the regulator 10 are configured to align with the longitudinal axis X of the valve body 14. The sleeve 50 is particularly constructed to align the stem 54, the first piston 60, and the second piston 62 with the control element 38 such that the actuator assembly 22 and the control element 38 are properly aligned within the bore 18 of the valve body 14. For example, the first plate 70 and the second plate 72 each define an aperture 87, 89, respectively, that is aligned with a longitudinal axis E of the sleeve 50. The longitudinal axis E is coaxial with the longitudinal axis X of the valve body 14 when the sleeve 50 is disposed in the bore 18. The cylindrical wall 66 of the sleeve 50 is shaped to substantially match a contoured wall defining the bore 18 of the valve body 14 so that the sleeve 50 is properly in axial alignment when the sleeve 50 is fully inserted into the valve body 14. The sleeve 50 includes a first end 51 and a second end 53. In the illustrated embodiment, the first end 51 has an inner diameter $S_1$ that is different than an inner diameter $S_2$ of the second end 53. In other embodiments, however, different sleeve geometries might be used to correspond to different geometries of the bore 18. The inner diameter $S_1$ of the first end 51 is sized and shaped to slidably receive the control element 38. The second end 53 is configured to abut against an inner wall of the valve body 14 such that the internal components of the regulator 10 are secured (e.g., clamped) in place when the inlet fitting 46 is secured to the valve body 14. When the control element 38 is in the fully open position, the second piston 62 is adjacent to the second end 53 of the sleeve 50.

The first and second pistons 60, 62 are configured to slide together against a smooth interior surface of the cylindrical wall 66 of the sleeve 50 in response to changes in pressure sensed by the actuator assembly 22. The first and second pistons 60, 62 are securely attached to the stem 54 such that the stem 54 and pistons 60, 62 move relative to the sleeve 50 while the sleeve 50 remains in a fixed position relative to the valve body 14. The stem 54 has a longitudinal axis F that is arranged to align with the longitudinal axis X of the valve body 14. As discussed further below, a plurality of chambers 88, 90, 92, and 94 are formed between the sleeve 50 and the first and second pistons 60, 62 and have varying internal volumes when the regulator 10 opens and closes. In particular, as shown in FIG. 3, a first chamber 88 is disposed between the first plate 70 of the sleeve 50 and the first piston 60, a second chamber 90 is disposed between the first piston 60 and the second plate 72 of the sleeve 50, a third chamber 92 is disposed between the second plate 72 of the sleeve 50 and the second piston 62, and a fourth chamber 94 is disposed downstream of the second piston 62. The fourth chamber 94 is partially defined by the cylindrical wall 66 of the sleeve 50 and the valve body 14. A travel indicator assembly 96 is partially disposed in the fourth chamber 94 and provides a visual indication of the position (e.g., partially open, fully open, closed) of the regulator 10.

In operation, the actuator assembly 22 actuates the control element 38 between the open position and the closed position in response to the balance of fluid pressures in the first, second, third, and fourth chambers 88, 90, 92, and 94 operating on the first and second pistons 60, 62. In the illustrated example, the first and third chambers 88, 92 are in fluid communication via the pathway 76 formed in the sleeve portions 50a, 50b (as described below), and the second and fourth chambers 90, 94 are in fluid communication via the passage 82 of the stem 54. Fluid pressure in the first and third chambers 88, 92 operates on the upstream surfaces 78, 80 of the first and second pistons 60, 62, respectively, to urge the first and second pistons 60, 62 in a first direction H toward the open position of the regulator 10. Fluid pressure in the second and fourth chambers 90, 94 operates on the downstream surfaces 84, 86 of the first and second pistons 60, 62, respectively, to urge the first and second pistons 60, 62 in a second direction G (opposite the first direction H) toward the closed position of the regulator 10.

The chambers 88, 90, 92, and 94 of the regulator 10 may be defined in relation to the location of the inlet 26 and the outlet 30, and generally in the direction of fluid flow. For example, fluid flows generally in the direction from the inlet 26 and towards the outlet 30 such that the first chamber 88 is an upstream chamber (i.e., the first upstream chamber 88) to the first piston 60 and the second chamber 90 is a downstream chamber (i.e., the first downstream chamber 90) to the first piston 60. Similarly, the third chamber 92 is an upstream chamber (i.e., the second upstream chamber 92) to the second piston 62 and the fourth chamber 94 is a downstream chamber (i.e., the second downstream chamber 94) to the second piston 62. Through the pathways in the sleeve 50 and/or stem 54, the first and second upstream chambers 88, 92 are in fluid communication with each other, and the first and second downstream chambers 90, 94 are in fluid communication with each other.

The regulator 10 further includes a spring 100, a valve cage 104, and a seal assembly 108 secured in the valve body 14 by the inlet fitting 46. The spring 100 is disposed between a spring seat 112 formed in the first plate 70 of the sleeve 50 and a spring seat 116 formed in the control element 38. As shown in FIGS. 1 and 3, the control element 38 includes a plurality of spokes 120 extending between a central hub 124 and an outer ring 128, which surrounds the spring 100. The central hub 124 defines a hub aperture 130 that is sized to receive a first end 132 of the stem 54. As shown in FIG. 3, the spokes 120 of the control element 38 extend radially outward from the central hub 124 at an angle. The apertures between the spokes 120 enable fluid pressure at the inlet 26 to operate on the upstream and downstream sides of the control element 38 surfaces equally such that the fluid inlet pressure does not act to urge the control element 38 in the direction H. The control element 38 is configured to slide with the stem 54 relative to the cage 104 and relative to the sleeve 50 between the open and closed positions. In the closed position, the outer ring 128 of the control element 38 cooperates with the seal assembly 108 to prevent fluid from flowing from the inlet 26 to the outlet 30. In particular, a radially outward portion of an upstream end of the outer ring 128 (opposite the spring seat 116) is configured to engage with the radial seal assembly 144 of the valve seat 42 as described in greater detail below. One or more seals may be disposed between the control element 38 and the sleeve 50.

FIG. 3 illustrates a spacer 134 that is coupled to the inlet end of the valve body 14. The spacer 134 is clamped between a flange at the upstream end of the regulator 10 and a corresponding flange (not shown) positioned upstream of the spacer 134 by bolts that span between the flanges and compress gaskets 136 that are positioned between the spacer 134 and each flange (only one such gasket 136 is shown). The spacer 134 can be removed by removing the bolts to enable insertion or removal of the internal components of the regulator 14 (e.g., the seal assembly 108, the actuator assembly 22 components, the control element 38 components, etc.) while the regulator 10 is installed.

Figure 4A:
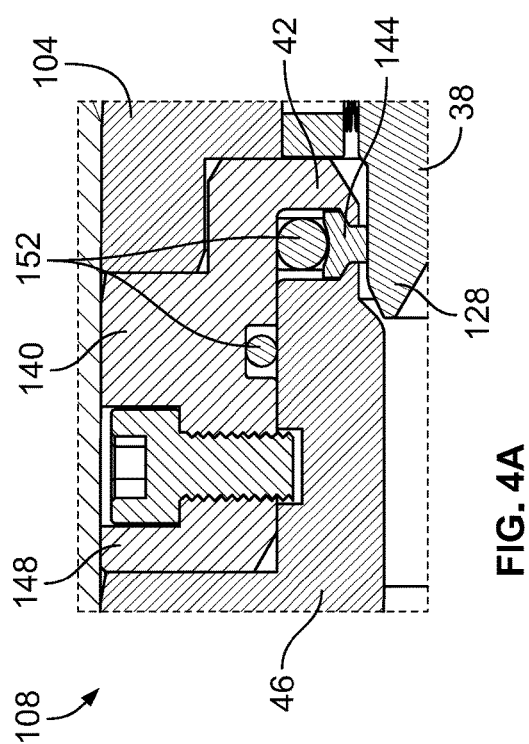
FIG. 4A is a magnified view of a portion of the regulator of FIG. 3, showing a seal assembly.

FIG. 4A illustrates the seal assembly 108 of FIG. 3 in more detail. The seal assembly 108 includes a retaining ring 140 and a radial seal ring 144 disposed in a groove between the retaining ring 140 and the inlet fitting 46. In the closed position, the outer ring 128 of the control element 38 sealably engages with the seal ring 144 to provide a fluid-tight engagement. The radial seal ring 144 is formed from a material such as Polytetrafluoroethylene (PTFE), which provides wear and chemical resistance and a smaller sealing force against the control element 38. A first O-ring 152 is positioned radially outward of the radial seal ring 144 within the groove between the retaining ring 140 and the inlet fitting 46 to urge the radial seal ring 144 into contact with the control element 38 when the regulator 10 is in the closed position. A second O-ring 152 is positioned between the retaining ring 140 and the inlet fitting 46. A fastener 148 secures the retaining ring 140 in place relative to the inlet fitting 46.

Figure 4C:
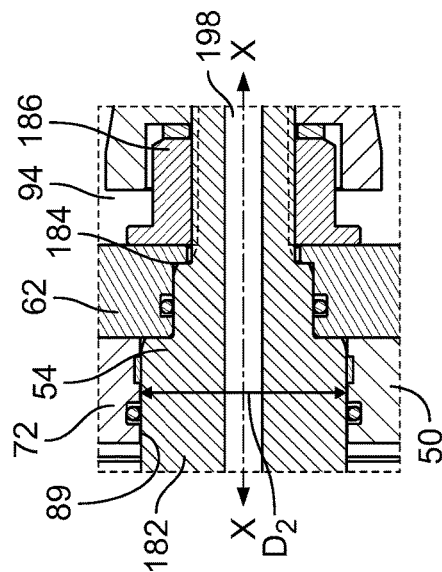
FIG. 4C is a magnified view of a different portion of the regulator of FIG. 3.
Figure 4B:
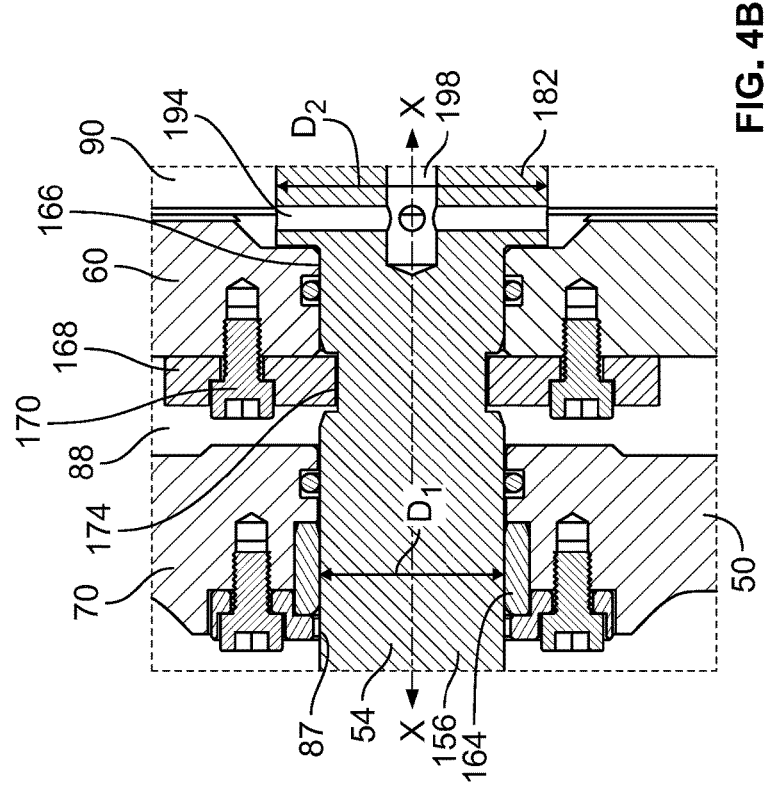
FIG. 4B is a magnified view of a different portion of the regulator of FIG. 3.

FIGS. 4B and 4C illustrate the actuator assembly 22 of FIG. 3 in more detail. In these figures, the connections between the stem 54 and the first plate 70, the stem 54 and the second plate 72, the stem 54 and the first piston 60, and the stem 54 and the second piston 62 are more clearly illustrated. These figures also illustrate the varying diameters (or thicknesses) of the stem 54 along the length of the stem 54. Each of the varying diameters of the stem 54 is sized to match up specifically with one of the first plate 70, the first piston 60, the second plate 72, or the second piston 62. The stem 54 is divided into segments or portions that slide relative to the first plate 70 of the sleeve 50 and relative to the second plate 72 of the sleeve 50. In FIG. 4B, a first portion 156 of the stem 54 is disposed through the aperture 87 of the first plate 70. The aperture 87 of the first plate 70 is particularly sized to receive the first portion 156 of the stem 54, which has an outer diameter $D_1$. A packing assembly 164 is secured to the first plate 70 and is configured to permit the stem 54 to slide relative to the first plate 70 while providing a sealed connection between the first plate 70 and the first portion 156 of the stem 54. FIG. 4B also illustrates the first piston 60 attached to a first stepped portion 166 formed in the outer surface of the stem 54. The first piston 60 is secured to the stem 54 via a retaining plate 168 and fasteners 170. The retaining plate 168 is disposed in an annular groove 174 formed in the stem 54 and that is sized to receive the retaining plate 168 such that the first piston 60 does not slide relative to the stem 54. Turning to FIG. 4C, the aperture 89 of the second plate 72 is particularly sized to receive a second portion 182 of the stem 54, which has an outer diameter $D_2$ that is different from the outer diameter $D_1$ of the first portion 156. FIG. 4C also illustrates the second piston 62 attached to a second stepped portion 184 formed in the outer surface of the stem 54. The second piston 62 is secured to the stem 54 via a retaining cap 186, which is threaded onto the stem 54. In other examples, the second piston 62 may be secured to the stem 54 by other suitable connections.

Figure 5:
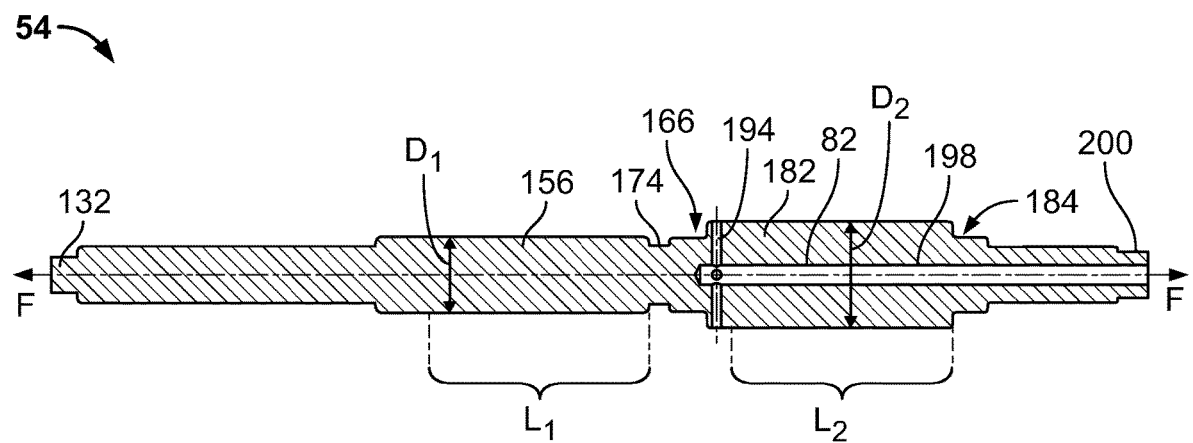
FIG. 5 is a cross-sectional view of a first exemplary stem of the regulator of FIG. 1.

As shown in FIG. 5, the first and second stepped portions 166, 184 and the different outer diameters $D_1$, $D_2$ of the stem 54 correspond to a particular placement of the stem 54 relative to the first and second plates 70, 72 of the sleeve 50. In operation, the stem 54 slides relative to the first plate 70 of the sleeve 50 along a length $L_1$ of the first portion 156 and relative to the second plate 72 of the sleeve 50 along a length $L_2$ of the second portion 182. The geometric configurations of the stem 54 and the valve body 14 ensure that the first plate 70, second plate 72, first piston 60, and second piston 62 are properly aligned within the valve body 14.

As shown in FIGS. 4B, 4C, and 5, the corresponding engagements between the stem 54 and the first and second plates 70, 72 of the sleeve 50 also ensure proper alignment of the pathway 76 connecting the first and third chambers 88, 92 and proper alignment of the passage 82 formed in the stem 54 connecting the second and fourth chambers 90, 94. As shown in FIG. 4B, the passage 82 includes a radial channel 194 (e.g., extending in a radial direction relative to the longitudinal axis X), and a longitudinal channel 198 centrally disposed in the second portion 182 of the stem 54 and extending axially through to a second end 200 of the stem 54. The radial channel 194 is in fluid communication with the second chamber 90 and is positioned adjacent to the downstream surface 84 of the first piston 60. The longitudinal channel 198 extends axially along the longitudinal axis X of the valve body 14, and terminates in the fourth chamber 94. The radial channel 194 is perpendicular to the longitudinal channel 198, however, in other examples, the channels 194, 198 may not be perpendicular to each other but, instead, may be non-parallel. Further, the stem 54 may include a plurality of connected components to provide the stem configuration, and may have a plurality of passages running parallel and/or staggered relative to each other to connect different chambers 88, 90, 92, and 94 of the actuator assembly 22.

Figure 6A:
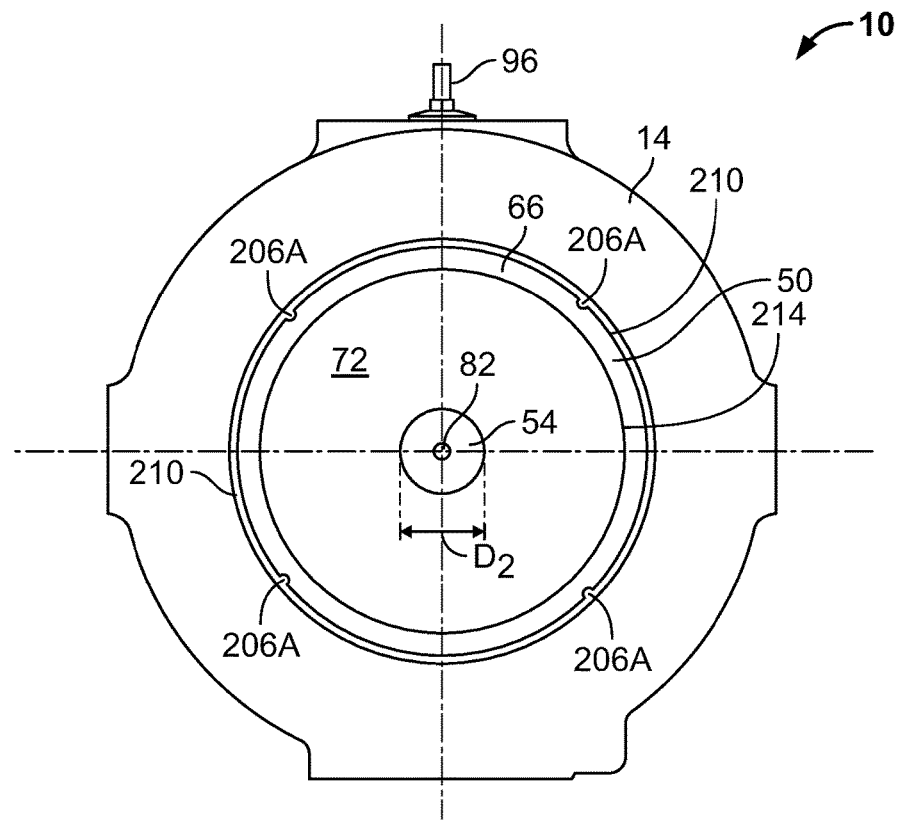
FIG. 6A is a first exemplary cross-sectional view of the regulator of FIG. 1 taken at I-I of FIG. 3.
Figure 6B:
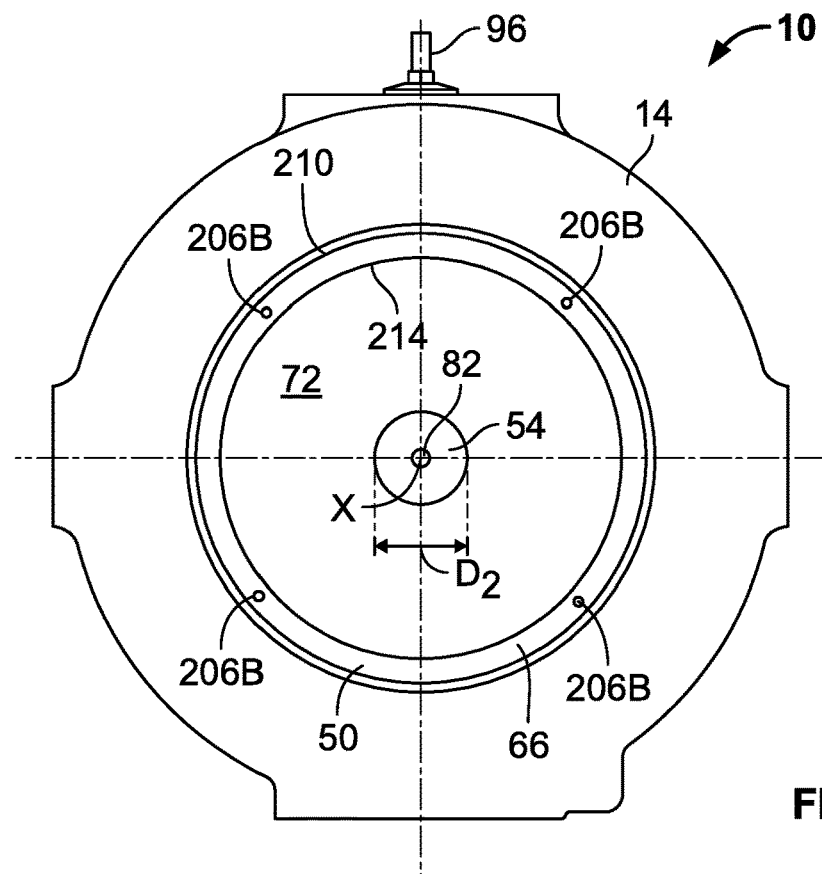
FIG. 6B is a second exemplary cross-sectional view of the regulator of FIG. 1 taken at I-I of FIG. 3.
Figure 7:
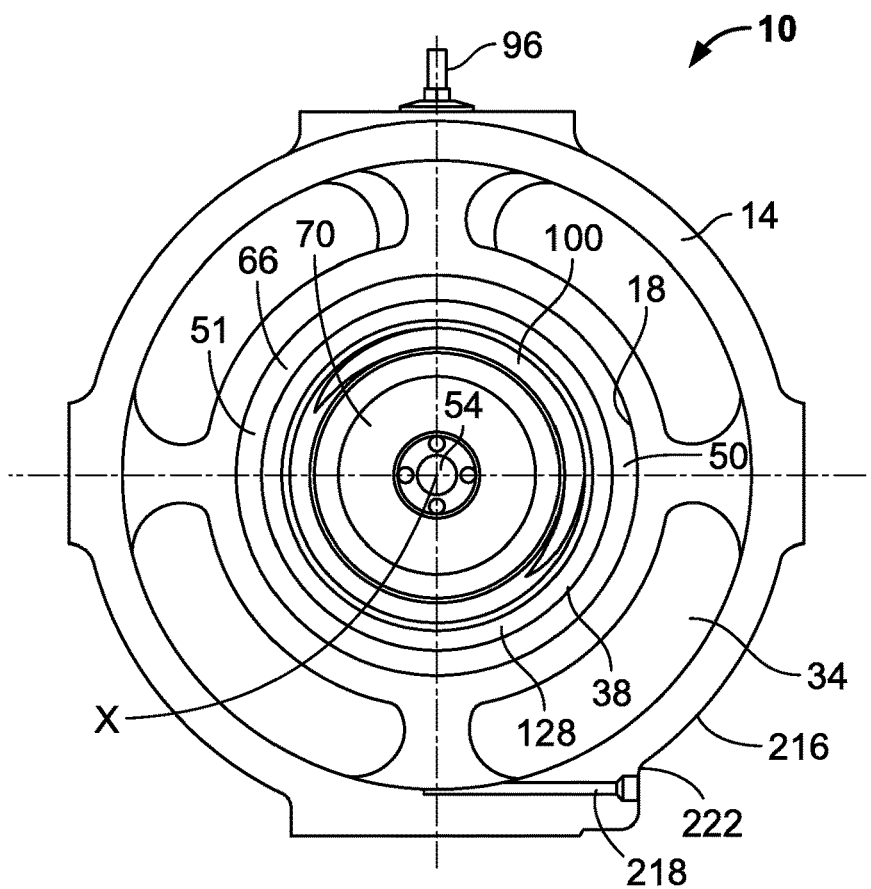
FIG. 7 is a cross-sectional view of the regulator of FIG. 1 taken at II-II of FIG. 3.

Returning briefly to FIG. 3, the pathway 76 formed in the sleeve 50 is partially illustrated. The pathway 76 includes one or more channels having both a lateral portion 202, which is depicted in FIG. 3, and an axial portion hidden from view in FIG. 3. Each lateral portion 202 extends radially inward from the cylindrical wall 66 within a portion of the second plate 72. Each lateral portion 202 of the pathway 76 connects to a bore 204 formed in a downstream surface of the second plate 72 of the sleeve 50 to provide fluid communication between the lateral portion 202 of the pathway 76 and the third chamber 92. Turning now to FIGS. 6A and 6B, first and second exemplary arrangements of an axial portion of the pathway 76 formed in the sleeve 50 are illustrated. Turning first to FIG. 6A, the axial portion of the pathway 76 includes one or more channels 206A (four channels are shown but more or fewer may be employed in different arrangements), where each channel 206A extends through the cylindrical wall 66 of the sleeve 50 to connect the first chamber 88 with the lateral portion 202 of the pathway 76. The channels 206A are formed in an exterior surface 210 of the sleeve 50 such that the pathway 76 is at least partially defined between the sleeve 50 and the valve body 14. In the second exemplary arrangement in FIG. 6B, the axial portion of the pathway 76 includes one or more channels 206B formed between an inner surface 214 of the cylindrical wall 66 and the outer surface 210 of the cylindrical wall 66 such that the axial portion of each of the channels 206B is embedded within the cylindrical wall 66 of the sleeve 50. In either arrangement in FIGS. 6A and 6B, the axial portion 206A, 206B of the pathway 76 ultimately extends between the lateral portion 202 and the upstream end of the second sleeve portion 50b. The downstream surface of the first plate 70 includes one or more grooves that comprise a further portion of the pathway 76 such that the first and third chambers 88, 92 are fluidly connected FIG. 7 of the regulator 10 illustrates a drain hole 218 formed in the valve body 14. The drain hole 218 fluidly couples the flow path 34 of the valve body 14 and the atmosphere, and may provide an access port to drain process fluid remaining in the valve body 14 (e.g., condensation). The drain hole 218 may be sealed with a plug that is accessible from an exterior surface 222 of the valve body 14.

Figure 8A:
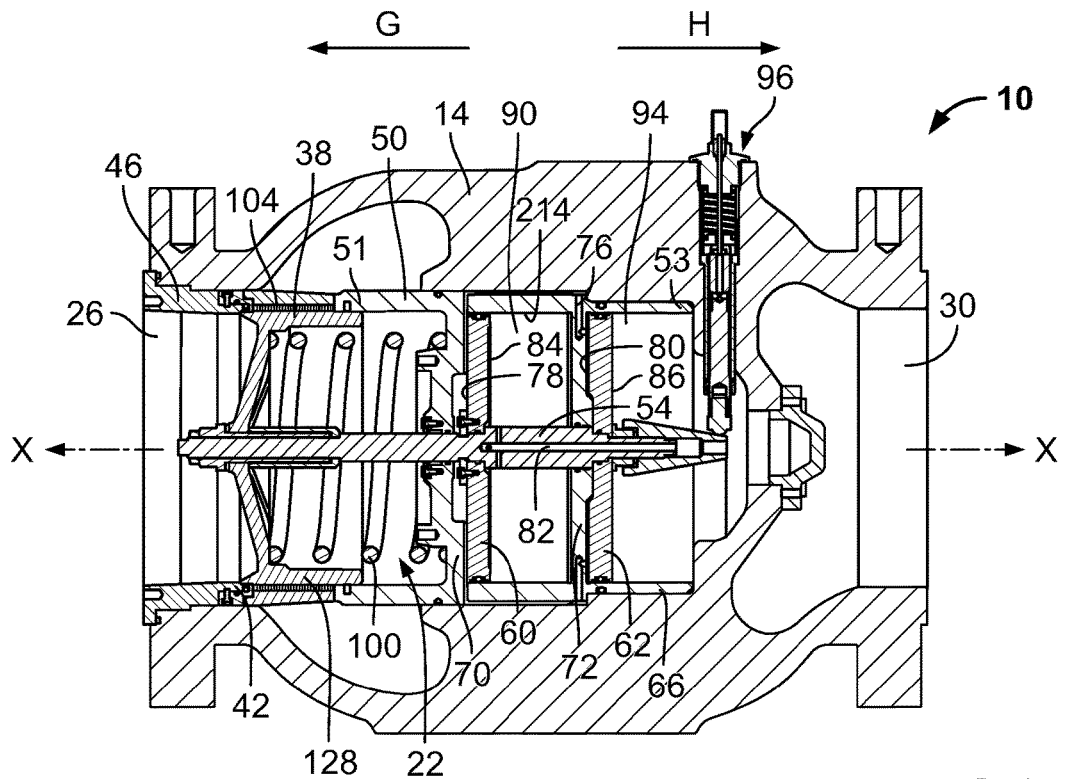
FIG. 8A is a front, cross-sectional view of the regulator of FIG. 1, showing the regulator in the closed position.
Figure 8B:
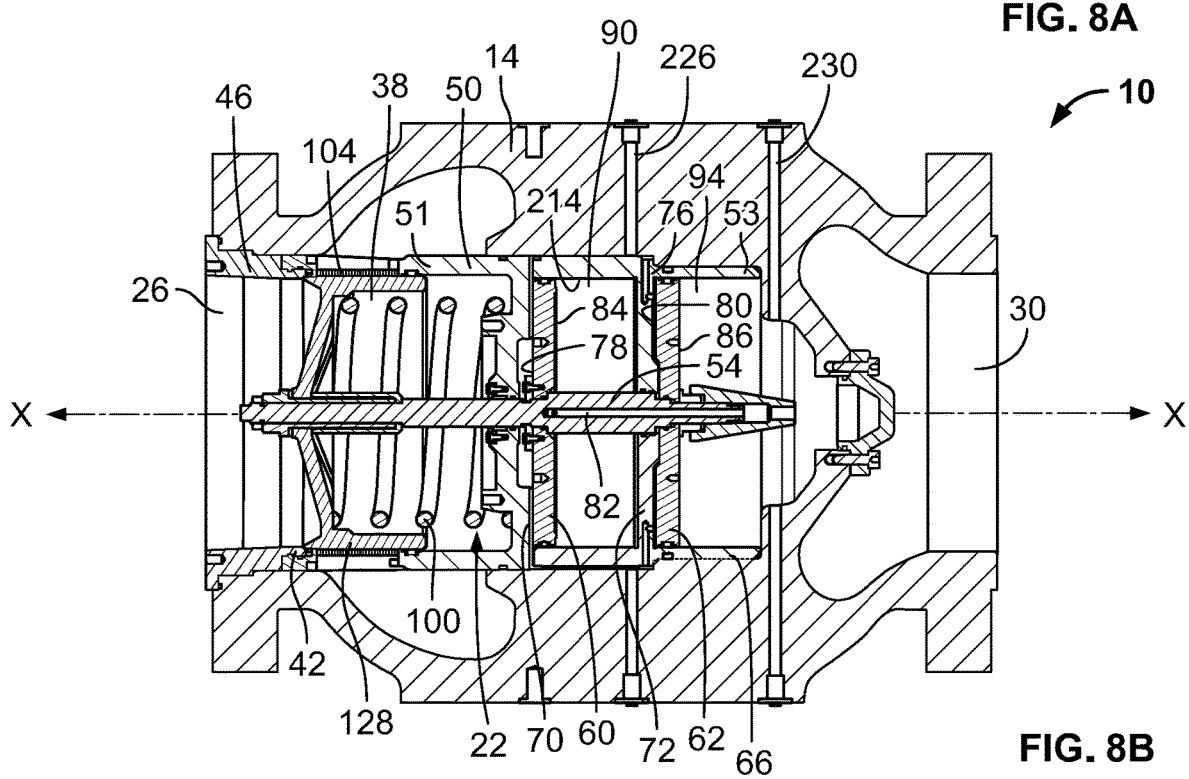
FIG. 8B is a top, cross-sectional view of the regulator of FIG. 1, showing the regulator in the closed position.
Figure 9A:
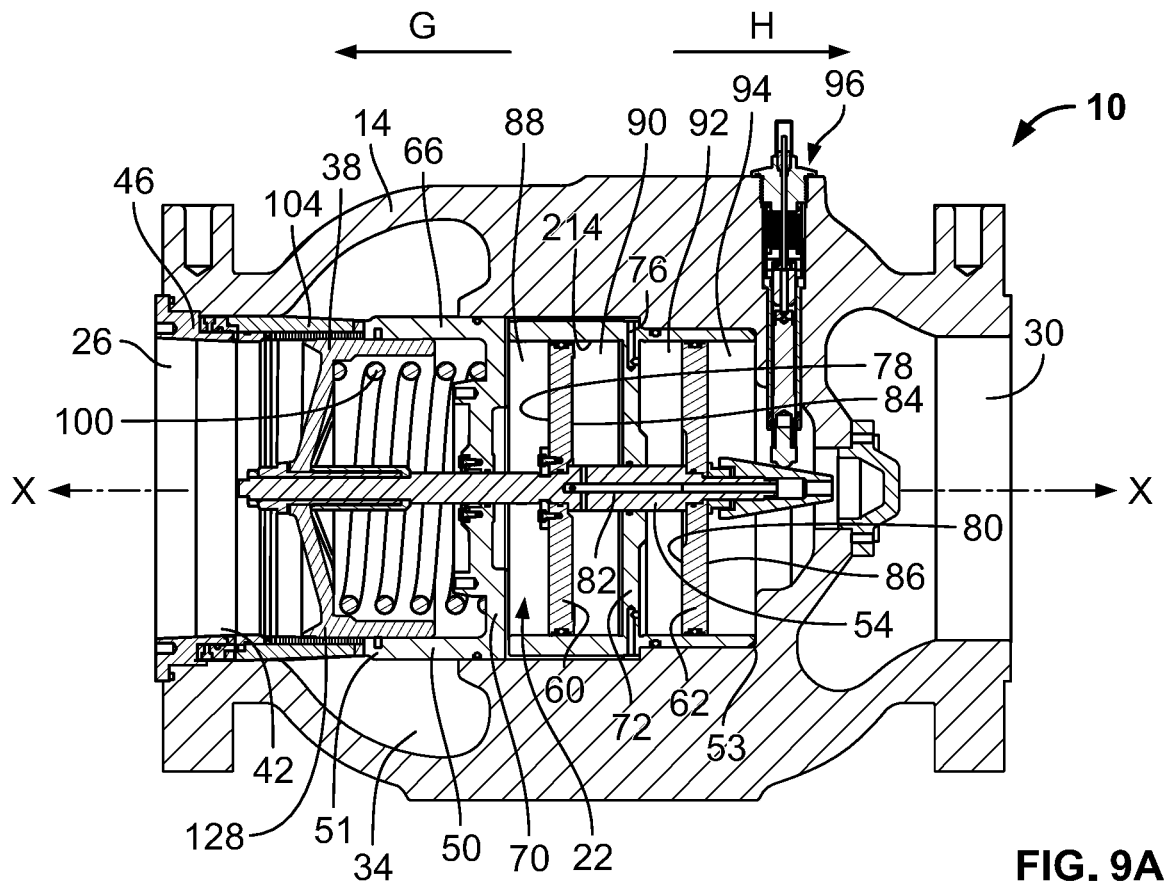
FIG. 9A is a front, cross-sectional view of the regulator of FIG. 1, showing the regulator in a partially open position.
Figure 9B:
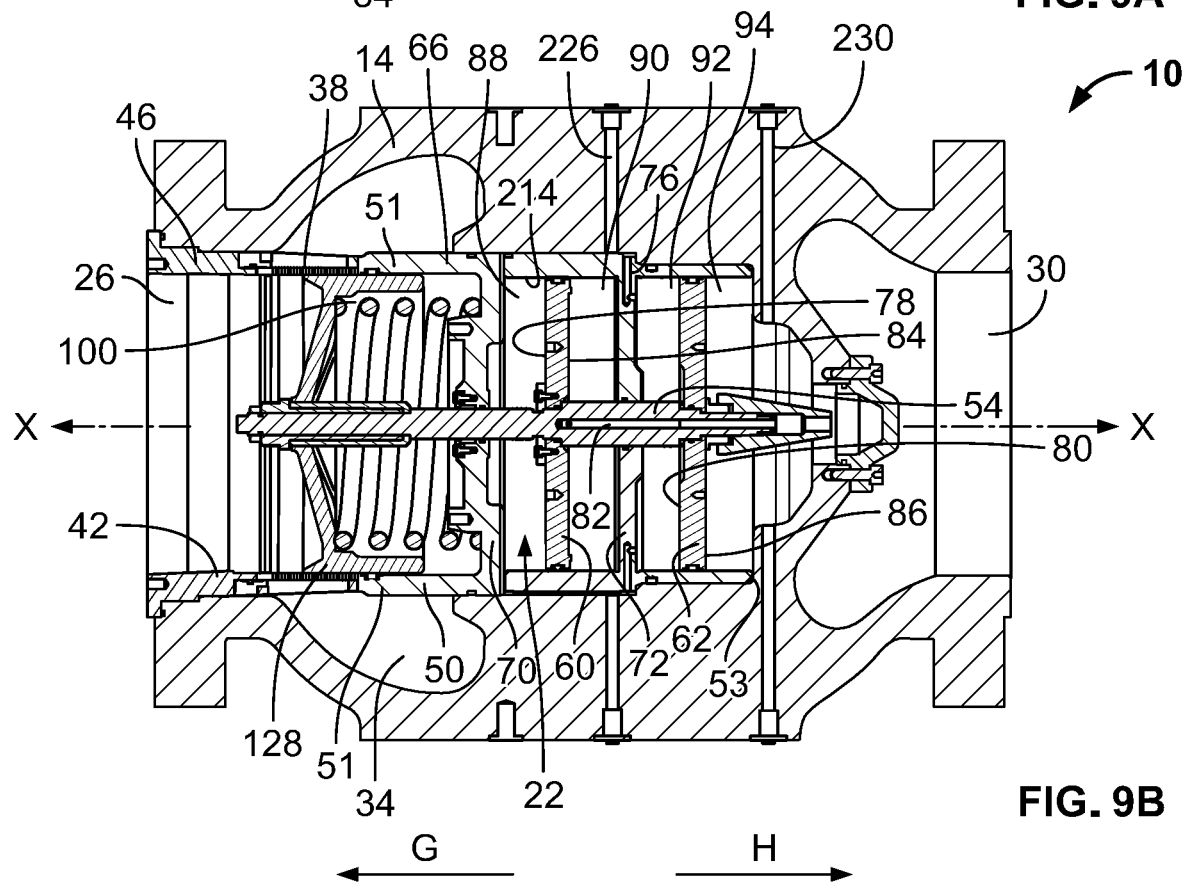
FIG. 9B is a top, cross-sectional view of the regulator of FIG. 1, showing the regulator in a partially open position.
Figure 10A:
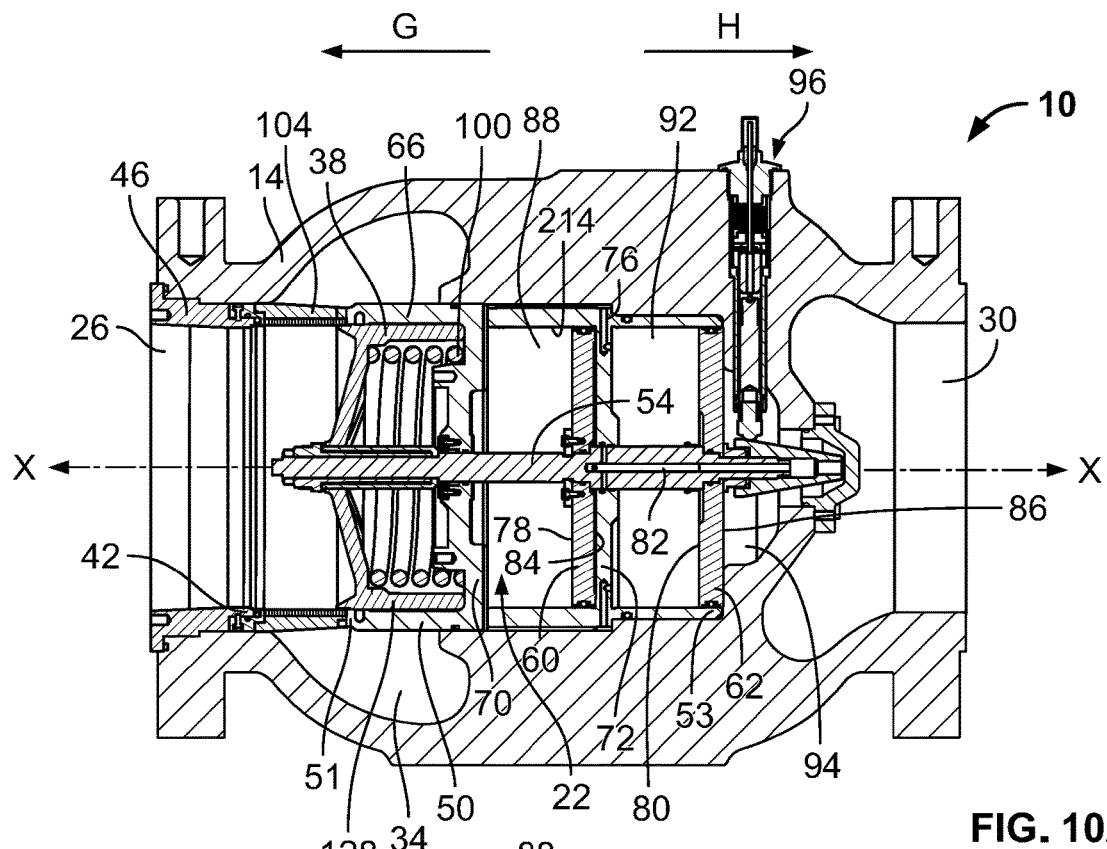
FIG. 10A is a front, cross-sectional view of the regulator of FIG. 1, showing the regulator in the fully open position.
Figure 10B:
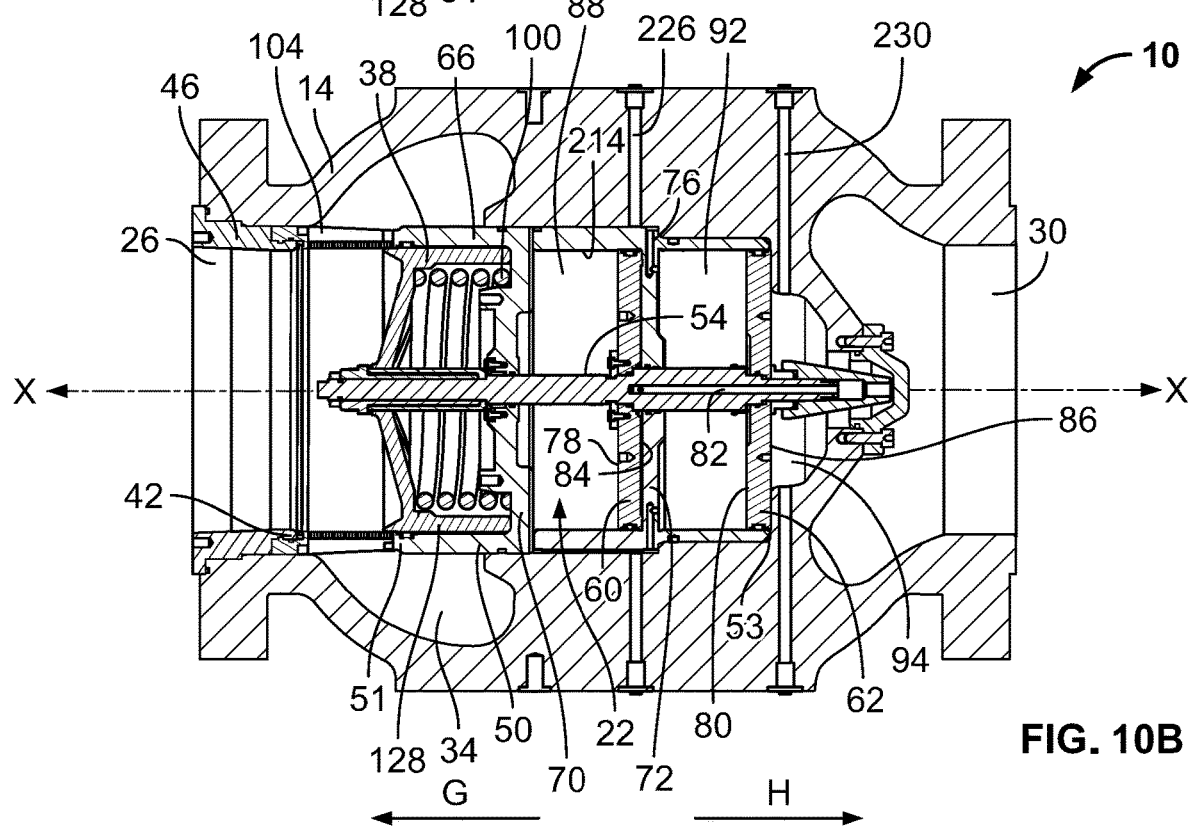
FIG. 10B is a top, cross-sectional view of the regulator of FIG. 1, showing the regulator in the fully open position.

FIGS. 8A, 8B, 9A, 9B, 10A, and 10B illustrate front and top views of the regulator 10 in the closed position (FIGS. 8A, 8B), a partially open position (FIGS. 9A, 9B), and a fully open position (FIGS. 10A, 10B). A pilot device may be operatively coupled to the regulator 10 to control piston movement of the actuator assembly 22 and regulate flow through the regulator 10. In particular, the pilot device may be configured to sense a fluid pressure upstream or downstream of the regulator 10 and adjust a loading pressure that is supplied to actuate the regulator 10 accordingly. In the illustrated example, a first channel 226 (FIGS. 8B, 9B, 10B) extends laterally (radially outwardly from the longitudinal axis X) through a side wall of the valve body 14 and terminates in the bore 18 to provide an external fluid connection with the pathway 76. The second sleeve portion 50b is structured such that the axial portion (e.g., 206A, 206B) of the pathway 76 is fluidly coupled with the first channel 226. As such, the first channel 226 is in fluid communication with the first and third chambers 88, 92 via the pathway 76. A second channel 230 extends laterally through the side wall of the valve body 14 and terminates in the bore 18 to provide an external fluid connection with the fourth chamber 94. As such, the second channel 230 is in fluid communication with the second and fourth chambers 90, 94 via the passage 82 in the stem 54. The channels 226, 230 may be located in other portions of the valve body 14 and/or may be configured to provide fluid pressure to other portions of the actuator assembly 22 inside the valve body 14. The channels 226, 230 may terminate at a connection fitting (e.g., a tubing fitting) at the exterior surface of the valve body 14 to facilitate connection to sense and loading lines as described below.

In a typical arrangement, the second channel 230 receives downstream pressure via a sense line and the first channel 226 receives a loading pressure from the pilot device via a loading line such that the regulator 10 functions as a pressure reducing regulator. In such an arrangement, when the downstream pressure is at or above the pressure setpoint of the pilot device, the pilot device supplies the downstream pressure as the loading pressure to the first channel 226. Accordingly, the force generated by the spring 100 and the fluid pressure (i.e., the downstream pressure) in the second and fourth chambers 90, 94 operating on the downstream surfaces 84, 86 of the first and second pistons 60, 62, respectively, exceeds the force generated by the fluid pressure (i.e., the downstream pressure) in the first and third chambers 88, 92 operating on the upstream surfaces 78, 80 of the first and second pistons 60, 62, respectively. As a result, the shaft 54 and the connected control element 38 are moved fully in the direction G until the first and second pistons 60, 62 are adjacent the first and second plates 70, 72 and the control element 38 engages the valve seat 42 as shown in FIGS. 8A and 8B. In this position, fluid is prevented from flowing from the inlet 26 to the outlet 30.

When downstream demand increases such that the downstream pressure drops below the pressure setpoint of the pilot device, the pilot device supplies an increased pressure (i.e., a pressure greater than the downstream pressure) as the loading pressure to the first channel 226. At this increased loading pressure, the force generated by the fluid pressure (i.e., the increased loading pressure) in the first and third chambers 88, 92 operating on the upstream surfaces 78, 80 of the first and second pistons 60, 62, respectively, exceeds the force generated by the spring 100 and the fluid pressure (i.e., the downstream pressure) in the second and fourth chambers 90, 94 operating on the downstream surfaces 84, 86 of the first and second pistons 60, 62, respectively. As a result, the shaft 54 and the connected control element 38 are moved in the direction H, which causes the control element 38 to disengage from the seat 42 and enables fluid to flow from the inlet 26 to the outlet 30. The force balance determines the actual position of the shaft 54 and the connected control element 38, and the flow capacity of the regulator 10 increases as the control element 38 moves away from the seat 42 in the direction H to the partially open position in FIGS. 9A and 9B and further to the fully open position in FIGS. 10A and 10B. While the above example describes a typical connection of a pilot device to the first and second channels 226, 230, the regulator 10 can also be configured differently. For example, the first channel 226 may alternatively be connected to the upstream pressure and the second channel 230 may be connected to the loading pressure supplied by a pilot device such that the regulator 10 functions as a backpressure regulator.

Turning now to FIGS. 11-14, alternative stem arrangements for use with the axial regulator 10 of FIGS. 1-10B are constructed according to the teachings of the present disclosure. Second, third, fourth, and fifth exemplary stems 236, 238, 240, and 242 are configured to slidably couple to the sleeve 50 of the actuator assembly 22 and therefore may replace the first exemplary stem 54. Each of the second, third, fourth, and fifth exemplary stems 236, 238, 240, and 242 define a first passage to fluidly couple the second and fourth chambers 90, 94 and a second passage to fluidly couple the first and third chambers 88, 92. Accordingly, the actuator assembly 22 utilizing one of the second, third, fourth, and fifth exemplary stems 236, 238, 240, and 242 may include a sleeve 50 similar to the first exemplary sleeve 50 illustrated in the previous figures but without one or more pathways 76 formed in the cylindrical sleeve 50.

In FIGS. 11, 11A, and 11B, the second exemplary stem 236 extends between a first end 244 and a second end 246 and includes a first passage 248, a second passage 250, and a third passage 252. The stem 236 may include the same shape as the stem 54 of FIG. 5 to facilitate assembly with the dual-piston actuator assembly 22. Similar to the stem 54 of FIG. 5, the longitudinal axis F of the second exemplary stem 236 is coaxial with the longitudinal axis X of the valve body 14. Additionally, the stem 236 includes a first portion 256 having a diameter $D_1$ and a second portion 260 having a diameter $D_2$. A first stepped portion 264 separates the first and second portions 256, 260 of the stem 236, and a second stepped portion 268 separates the second portion 260 and the second end 246. Similar to the passage 82 of the stem 54 of FIG. 5, the first passage 248 extends partially through the stem 236 in a direction parallel with the longitudinal axis F. The first passage 248 includes a radial channel 272 (e.g., extending in a radial direction relative to the longitudinal axis F), and a longitudinal channel 276 extending between the radial channel 272 and the second end 246 of the stem 236. More particularly, the radial channel 272 extends through an exterior surface 280 of the stem 248 in the second portion 260 so that the radial channel 272 is in fluid communication with the second chamber 90 and is positioned adjacent to the downstream surface 84 of the first piston 60. The longitudinal channel 276 extends axially (or parallel) relative to the longitudinal axis X of the valve body 14, and terminates in the fourth chamber 94.

By comparison to the stem 54 of FIG. 5, the second exemplary stem 236 is configured to fluidly couple the first and third chambers 88, 92 of the regulator 10. The second and third passages 250, 252 are symmetrical about the longitudinal F axis of the stem 236 and extend between the first portion 256 and through to the second portion 260 of the stem 236. The second passage 250 includes a first radial channel 284 formed in the first portion 256 of the stem 236, a second radial channel 288 formed in the second portion 260 of the stem 236, and a longitudinal channel 292 extending between the first and second radial channels 284, 288. The first and second radial channels 284, 288 are positioned relative to the stem 236 such that the second passage 250 is in fluid communication with the first and third chambers 88, 92 of the regulator 10. As such, it will be appreciated that the first plate 70 and the second plate 72 of the sleeve 50, for example, are shaped to permit fluid communication between the first and third chambers 88, 92, via the radial channels 284, 288 and are connected to the longitudinal channel 292. It will also be appreciated that the third passage 252 is substantially similar to the second passage 250 such that any details of the second passage 250 apply equally to the third passage 252. The first, second, and third passages 248, 250, and 252 may have the same inner diameter, or the first passage 248 may have an inner diameter that is greater than the inner diameter of each of the second and third passages 250, 252. In one example, a combined flow capacity of the second and third passages 250, 252 substantially matches the flow capacity of the first passage 248.

In FIGS. 12, 12A, and 12B, the third exemplary stem 238 is constructed according to the teachings of the present disclosure. The third exemplary stem 238 is similar to the second exemplary stem 236 of FIGS. 11, 11A, and 11B, however, the third exemplary stem 238 includes first and second passages. Similar to the second exemplary stem 236, the first passage 248 of the third exemplary stem 238 is axially aligned with the longitudinal axis F, and the second passage 250 is parallel and radially offset relative to the longitudinal axis F. Additionally, the longitudinal axis F of the third exemplary stem 238 is coaxial with the longitudinal axis X of the valve body 14. In the illustrated example, an inner diameter of the first passage 248 is equal to an inner diameter of the second passage 250. However, in other examples, the inner diameter of the passages 248, 250 are different. In yet another example, both of the first passage 248 and the second passage 250 may be radially offset relative to the longitudinal axis F.

In FIGS. 13 and 13A, the fourth exemplary stem 240 is constructed according to the teachings of the present disclosure. When the fourth exemplary stem 240 is disposed in the valve body 14, the longitudinal axis F of the stem 240 is coaxial with the longitudinal axis X of the valve body 14. The fourth exemplary stem 240 is similar to the second exemplary stem 236 of FIGS. 11, 11A, and 11B, however, the second and third passages 250, 252 of the fourth exemplary stem 240 extend from the first end 244 to the second portion 260 of the stem 240. To facilitate manufacturing, the first passage 248 is formed by drilling the longitudinal channel 276 from the second end 246, and the second and third passages 250, 252 are formed by drilling the longitudinal channels 292 from the first end 244 of the stem 240. A radial channel 294 extends through the first portion 256 of the stem 240 to connect the longitudinal channels 292 of the first and second passages 250, 252. A stopper 296 is perpendicularly disposed relative to the longitudinal channels 292 of the second and third passages 250, 252 to isolate fluid communication of the second and third passages 250, 252 between the first and third chambers 88, 92. To further isolate the longitudinal channels 292 of the second and third passages 250, 252, a stopper 300, 302 is disposed in one of the longitudinal channels 292 at the first end 244 of the stem 240.

In FIGS. 14, 14A, 14B, 14C, and 14D, the fifth exemplary stem 242 is constructed according to the teachings of the present disclosure. The fifth exemplary stem 242 is formed by overlapping the first, second, and third passages 248, 250, 252 without connecting the first passage 248 with either of the second or third passages 250, 252. When the fifth exemplary stem 242 is disposed in the valve body 14, the longitudinal axis F of the stem 242 is coaxial with the longitudinal axis X of the valve body 14. This overlapping construction can be formed using additive manufacturing (AM) techniques. As shown in FIG. 14A, the radial channel 272 of the first passage 248 is angled such that the radial channel 272 does not connect with the second and third passages 250, 252. In FIG. 14B, the first, second, and third passages 248, 250, 252 are aligned such that the first passage 248 is axially aligned with the longitudinal axis F, and each of the second and third passages 250, 252 is radially offset relative to the longitudinal axis F and is spaced evenly from the first passage 248. However, as shown in FIG. 14C, the first passage 248 is radially offset relative to the longitudinal axis F so that the first passage 248 does not intersect with a second radial channel 306 (disposed through the second portion 260 of the stem 242) of the second and third passages 250, 252. Instead, the first passage 248 curves around the radial second channel 306 of the second and third passages 250, 252, as shown in FIG. 14C, such that the first passage 248 is axially aligned with the longitudinal axis F at the second end 246 of the stem 242, as shown in FIG. 14D.

In FIG. 15, the first exemplary indicator assembly 96 is constructed according to the teachings of the present disclosure. The indicator assembly 96 is operatively coupled to the regulator 10 and provides a visual display based on the position of the regulator 10. The visual display is externally located relative to the valve body 14 so that an operator will understand the position of the control element 38 from a distance. Specifically, the indicator assembly 96 is operatively coupled to the stem 54, so that when the control element 38 moves between the open and closed positions, the stem 54 causes the indicator assembly 96 to display a change in position of the control element 38. The indicator assembly 96 is at least partially disposed in a radial bore 310 formed in the valve body 14, and includes a rod 314, an indicator 318 operatively coupled to the rod 314, a spring 320, and a plug 322. The rod 314 is perpendicularly disposed relative to the longitudinal axis X of the valve body 14, and is aligned with a longitudinal axis Y. The rod 314 of the indicator assembly 96 is movable between a first position when the control element 38 is in the closed position, as shown in FIGS. 3, 8A, and 15, and a second position when the control element 38 is in the open position, as shown in FIGS. 1 and 10A. It will be appreciated that the indicator assembly 96 also occupies additional positions between the first and second positions to display the positioning of the control element 38 when the regulator 10 is between the open and closed positions, such as, for example, when the control element 38 is in the partially open position shown in FIG. 9A. In FIG. 15, the longitudinal axis Y of the rod 314 is oriented at an angle β of 90 degrees relative to the longitudinal axis F of the stem 54 and the longitudinal axis X of the valve body 14. However, in other examples the angle β between the longitudinal axis Y of the indicator assembly 96 and the longitudinal axis X of the valve body 14 may be anywhere between 0 degrees to 180 degrees.

In FIG. 15, the rod 314 includes a first end 326 slidably coupled to the second end 200 of the stem 54 and a second end 330 spaced away from the first end 326 and operatively coupled to the indicator 318. Specifically, the first end 326 of the rod 314 is slidably coupled to a conical cap 334 that is secured to the second end 200 of the stem 54. The cap 334 has a bore 338 that is both sized to receive the second end 200 of the stem 54 and is in fluid communication with the passage 82 of the stem 54 to maintain fluid communication between the passage 82 and the fourth chamber 94. The cap 334 has a sloped outer surface 342 that tapers from a wide first end 344 to a narrow second end 348. In other words, the second end 348 of the cap 334 has an outer diameter that is smaller than an outer diameter of the first end 344 of the cap 334 such that the rod 314 is axially displaced relative to the longitudinal Y axis as the stem 54 moves axially relative to the longitudinal axis X of the valve body 14. In particular, the outer surface 342 of the cap 334 is sloped at an angle α relative to the longitudinal axis X. In FIG. 15, the second end 348 of the cap 334 is in contact with a roller ball 352 securably coupled to the first end 326 of the rod 314. The roller ball 352 facilitates the movement of the rod 314 relative to the stem 54 as the stem 54 moves between the open and closed positions.

The rod 314 moves axially (e.g., upwards in the J direction and downwards in the K direction) along the Y axis to move the indicator 318 outside of the valve body 14 according to the position of the control element 38. A guide sleeve 356 is disposed between the valve body 14 and the rod 314 to steadily guide the rod 314. The extent to which the indicator 318 extends outside of the valve body 14 is indicative of the degree of opening of the regulator 10. For example, when the control element 38 is in the open position, the roller ball 352 is in contact with the first end 344 of the cap 334 and the indicator 318 is fully extended in the direction J. When the control element 30 is in the closed position, however, the roller ball 352 is in contact with the second end 348 of the cap 334 and the indicator 318 is fully retracted in the direction K. The extension of the indicator 318 relative to the valve body 14 as shown in FIG. 10A (fully open) is greater than the extension of the indicator 318 relative to the valve body 14 as shown in FIG. 9A (partially open), which is, in turn, greater than the extension of the indicator 318 relative to the valve body 14 as shown in FIG. 8A, because the rod 314 is displaced a minimal amount when roller ball 352 is adjacent to the second end 348 of the cap 334 (in the closed position) and is displaced a maximum amount when the roller ball 352 is adjacent to the first end 344 of the cap 334 (in the open position).

As shown in FIG. 15, the indicator 318 is slidably coupled to the plug 322 and is extendable outside of the valve body 14. In the illustrated example, the indicator 318 is secured to the second end 330 of the rod 314, however, the indicator 318 may be part of the rod 314. The indicator assembly 96 also includes the spring 320 contained between the plug 322 and a spring seat 360. The spring seat 360 is carried by the rod 314 and moves axially along the longitudinal axis Y (e.g., upwards in the J direction and downwards in the K direction) and compresses the spring 320 against the plug 322. The spring 320 ensures that the roller ball 352 maintains contact with the cap 334. External threads 364 of the plug 322 rotatably couple to internal threads 368 of the bore 310 of the valve body 14 to secure the plug 322 to the valve body 14. The plug 322 may be removed from the body 14 by rotating the plug 322 relative to the valve body 14 to access the indicator assembly 96 or to adjust the calibration of the indicator 318. The indicator 318 is visible through a cover 372 attached to the plug 322. The cover 372 is preferably be transparent so that an operator can easily view the length the indicator 318 extending outside of the valve body 14. In some examples, the cover 372 may have a scale with measurements or markings that correspond to the different positions of the indicator 318. In some examples, the indicator 318 may have a color (e.g., red) that is clearly visible through the cover 372 and against the environment in which the regulator 10 is installed.

Generally in operation, when the regulator 10 opens, the actuator assembly 22 causes the stem 54 to move in the H direction. As the stem 54 moves, the sloped surface 342 of the cap 334 slides against the roller ball 352 and pushes the rod 314 in the J direction perpendicular relative to the H direction. The rod 314, which carries the indicator 318, moves the indicator 318 in the J direction such that the indicator 318 extends outside the valve body 14 and slides into view relative to the cover 372 to display the positioning of the regulator 10. As the rod 314 moves in the J direction, the rod 314 causes the spring seat 360 to compress the spring 320 against the plug 322 so that when the stem 54 moves in the G direction, the spring 320 expands and biases the spring seat 360 to move the rod 314 in a K direction (opposite the J direction). As the rod 314 moves in the K direction, the indicator 318 also moves in the K direction and slides out of view relative to the cover 372.

The indicator assembly 96 advantageously provides accurate readings of the position of the regulator 10 based on an orientation of the indicator assembly 96 relative to the longitudinal axis X of the valve body 14. As shown in FIG. 15, the indicator assembly 96 is perpendicular relative to the longitudinal axis F of the stem 54 and longitudinal axis X of the valve body 14 such that angle β is 90 degrees. To determine the displacement of the stem 54 or the displacement of the rod 314 the following equation may be used:

$$L = \frac{\Delta h}{\sin \beta} = \Delta x \frac{\tan \alpha}{\sin \beta}$$

where L is displacement of the travel indicator 318, Δx is the displacement of the stem 54, and Δh, is the displacement of the rod 314 in the direction perpendicular to the axial direction of the stem 54. Because the angle β=90, the equation may be simplified to the following:

$$L = \Delta h = \Delta x \tan \alpha$$

While the travel indicator assembly 96 has been described in the context of its use in the pressure regulator 10, the travel indicator assembly 96 can also be utilized in other types of fluid control devices. As will be described further below, different iterations of the travel indicator assembly may include at least one feature that is operatively coupled to the rod and operatively couplable to a stem to indicate travel of the stem of the pressure regulator or other fluid control device. In the following examples, the roller ball feature of the travel indicator assembly is replaced by, for example, a rack and pinion feature, a cord and roller feature, or a hinged arm feature.

FIG. 16 illustrates a second exemplary indicator assembly 496 constructed according to the teachings of the present disclosure. The second exemplary indicator assembly 496 may replace the first exemplary indicator assembly 96 to operate with the regulator 10 of FIGS. 1-10B. The second exemplary indicator assembly 496 is similar to the indicator assembly 96 discussed above, except the second exemplary indicator assembly 496 utilizes engagement of the stem 54 and a rod 414 to convert axial movement (e.g., in G and H directions) of the stem 54 of the regulator 10 to rotational movement (e.g., in R and T directions) of the rod 414 to display the positioning of the control element 38 in a rack and pinion embodiment (FIG. 16A) or, alternatively, to convert axial movement (e.g., in G and H directions) of the stem 54 to axial movement (e.g., in J and K directions) of the rod 414 to display the positioning of the control element 38 in a rack and rack embodiment (FIG. 16B). Elements of the second exemplary indicator assembly 496 which are similar to the elements of the first exemplary indicator assembly 96 are designated by the same reference numeral, incremented by 100. A description of many of these elements is abbreviated or even eliminated in the interest of brevity.

The second exemplary indicator assembly 496 of FIG. 16 is arranged in either a rack and pinion configuration (FIG. 16A), or a rack and rack configuration (FIG. 16B). In the rack and pinion embodiment illustrated in FIG. 16A, an indicator 418 of the indicator assembly 496 does not move in the vertical direction along the Y axis, but instead rotates relative to the Y axis when the stem 54 moves axially along the longitudinal axis X. For example, movement of the stem 54 in the H direction causes the rod 414 of the indicator assembly 496 to rotate in a T direction about the longitudinal axis Y of the stem 414. The rotational motion of the indicator assembly 496 may be configured in a number of different ways. In the illustrated example of FIG. 16A, the rod 414 has a corrugated outer surface 452 providing a plurality of teeth that are configured to matingly engage with a corrugated outer surface 442 of the second end 200 of the stem 54. The teeth of the outer surface 452 of the rod 414 engage with the teeth of the corrugated surface 442 of the stem 54, such that as the stem 54 moves axially in the G or H directions, the stem 54 engages the teeth of the rod 414 to rotate the rod 414 in either the T or R directions, respectively. The corrugated surface 442 of the stem 54 and the teeth of the outer surface 452 of the rod 414 may be arranged to provide a particular gear ratio to achieve a desired degree of rotation of the rod 414 corresponding to the full linear travel of the stem 54.

As the indicator 418 rotates, a position of the control element 38 may be displayed based on the rotational position of the indicator 418. In the illustrated example, the second piston 62 is adjacent to the second end 53 of the sleeve 50 such that the control element 38 is in the open position. In the open position, the indicator 418 displays a triangular flag with a pointed end pointing toward the inlet 26 of the valve body 14. In the closed position, the flag of the indicator 418 may be configured to point toward the outlet 30 of the valve body 14. In another example, the flag of the indicator 418 may be pointed toward the inlet 26 when the regulator 10 is closed, and the flag of the indicator 418 may be pointed toward the outlet 30 when the regulator 10 is open. The indicator 418 may display positioning of the regulator 10 in other ways, for example, by exposing different colors or displaying text as the indicator 418 rotates in a display case or cover 472. In yet other examples, the indicator 418 provide a different visible signal to communicate the positions of the regulator 10. For example, the indicator may match up with different measurements or markings on the cover 472 based on the position of the regulator 10.

In operation, the stem 54 moves in the H direction to open the regulator 10. The corrugated outer surface 442 of the stem 54 engages the corrugated outer surface 452 of the rod 414, causing the rod 414 to rotate in the T direction (counterclockwise in FIG. 16A) about the Y axis. As shown in FIG. 16, the regulator 10 is in the fully open position and the flag of the indicator 418 is pointing away from the outlet 30 (i.e., toward the inlet 26). When the regulator 10 closes, the stem 54 moves in the G direction (opposite the H direction) and engages the rod 414 to rotate the rod 414 in a R direction (clockwise in FIG. 16A) about the Y axis. Rotation of the rod 414 causes rotation of the flag of the indicator 418 such that when the control element 38 is in the closed position, the flag of the indicator 418 points toward the outlet 30 of the valve body 14.

In the rack and rack embodiment illustrated in FIG. 16B, the rod 414 includes helical threads 474 that are configured to engage with helical threads 476 of the stem 54. In this configuration, the helical threads 476 of the stem 54 engage the helical threads 474 of the rod 414 when the stem 54 moves in the G or H direction to move the rod 414 axially in the J or K direction. As the stem 54 moves in the H direction, the helical threads 476 of the stem 54 engage the helical threads 474 of the rod 414 to move the rod 414 in the J direction, extending the indicator 418 into the display cover 472. As the stem 54 moves in the G direction, the helical threads 476 of the stem 54 engage the helical threads 474 of the rod 414 to move the rod 414 in the K direction to lower the indicator 418 within the display cover 472. Thus, like the travel indicator assembly 96, the rack and rack embodiment of the travel indicator assembly 496 indicates the position of the regulator 10 based on the position of the indicator 418 along the Y axis. In another example, the indicator assembly 496 may be constructed differently to translate axial movement of the stem 54 into rotational movement of the rod 414 and indicator 418. In yet another example, a fluid regulator may be constructed such that rotational movement of the stem 54 moves the control element 38 between open and closed positions. In this case, the indicator assembly 496 would be configured to convert the rotational movement of the stem 54 into axial movement of the rod 414 and indicator 418 to display the positioning of the regulator 10.

Figure 17:
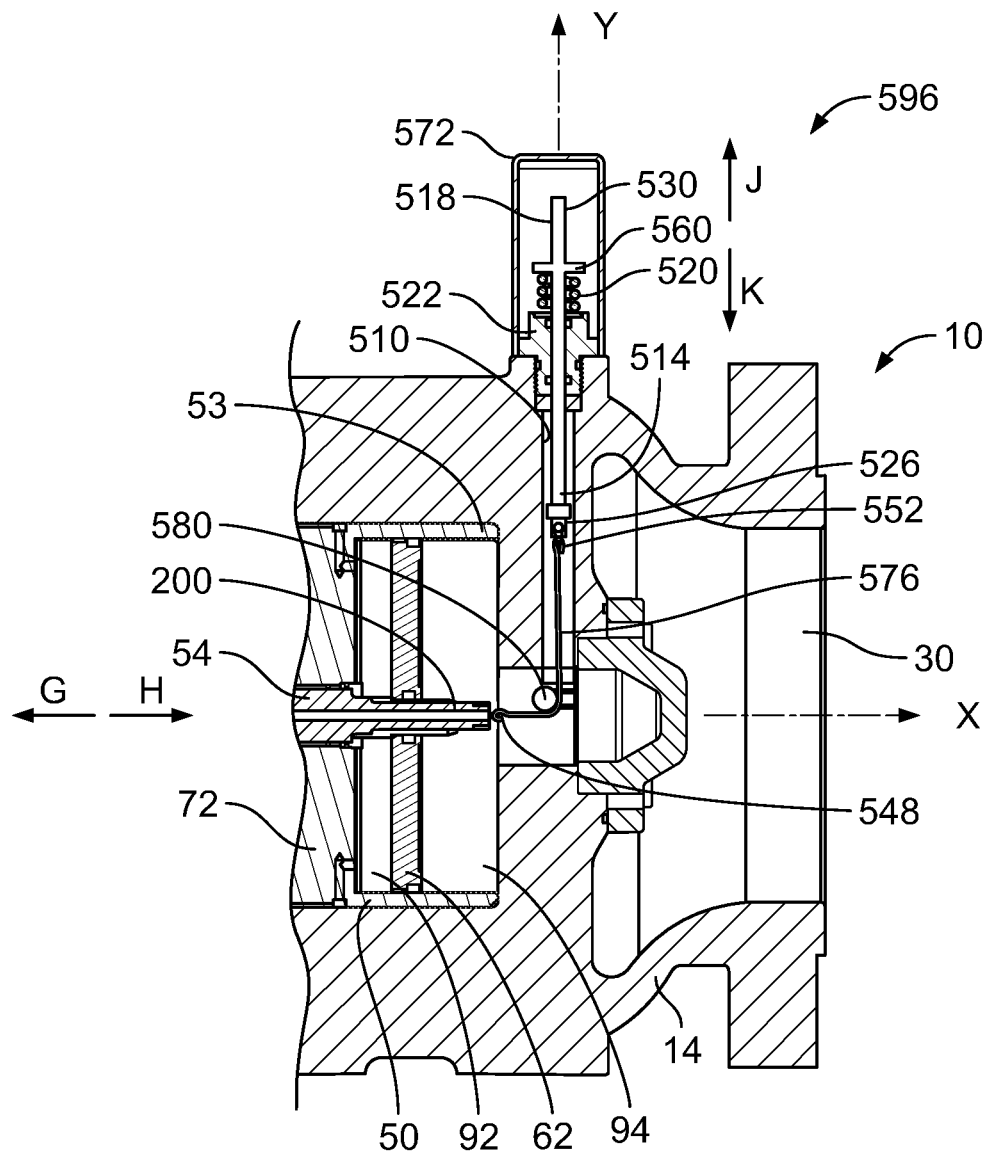
FIG. 17 is a partial, cross-sectional view of a third exemplary indicator assembly assembled in accordance with the teachings of the present disclosure, and disposed in the regulator of FIG. 1.

FIG. 17 illustrates a third exemplary indicator assembly 596 constructed according to the teachings of the present disclosure. The third exemplary indicator assembly 596 may replace the first exemplary indicator assembly 96 to operate with the regulator 10 of FIGS. 1-10B. The third exemplary indicator assembly 596 is similar to the indicator assembly 96 discussed above, except the third exemplary indicator assembly 596 includes a cord 576 and roller assembly 580 to translate an axial movement of the stem 54 (e.g., in G and H directions) to an axial movement of the rod 514 (e.g., in J and K directions). Elements of the third exemplary indicator assembly 596 which are similar to the elements of the first exemplary indicator assembly 96 are designated by the same reference numeral, incremented by 200. A description of many of these elements is abbreviated or even eliminated in the interest of brevity.

As shown in FIG. 17, the rod 514 is operatively coupled to the stem 54 by way of the cord 576 and roller assembly 580. In particular, the cord 576 is operatively coupled to the second end 200 of the stem 54 at a first hook 552 and to a first end 526 of the rod 514 at a second hook 548. The roller assembly 580 is coupled to the cord 576 to transmit displacement of the stem 54 to the rod 514 via the cord 576. The cord 576 bends around the roller assembly 580 such that a portion of the cord 576 moves in the G and H directions with the stem 54, and a portion of the cord 576 moves in the J and K directions with the rod 514. The cord 576 is a flexible material, such as a steel wire to bend around the roller assembly 580, yet is sufficiently rigid so the cord 576 remains in tension between the stem 54 and the rod 514. A spring 520 is disposed between a spring seat 560 extending radially outward from the rod 514 and a plug 522. The spring 520 expands in the J direction when the stem 54 moves in the H direction and compresses in the K direction when the stem 54 moves in the G direction. In operation, the stem 54 pulls the cord 576 in the G direction to close the regulator 10, and the rod 514 pulls the cord 576 in the J direction when the stem 54 moves in the H direction. The spring 520 helps ensure that the steel cord 576 stays taught to properly respond to the movement of the stem 54. In this case, the indicator 518 is the second end 530 of the rod 514 such that the rod 514 is slidably disposed through a bore in the plug 522 to extend outside of the valve body 14 to indicate the positioning of the control element 38. However, in another example, the rod 514 and the indicator element 518 are separate components.

Figure 18:
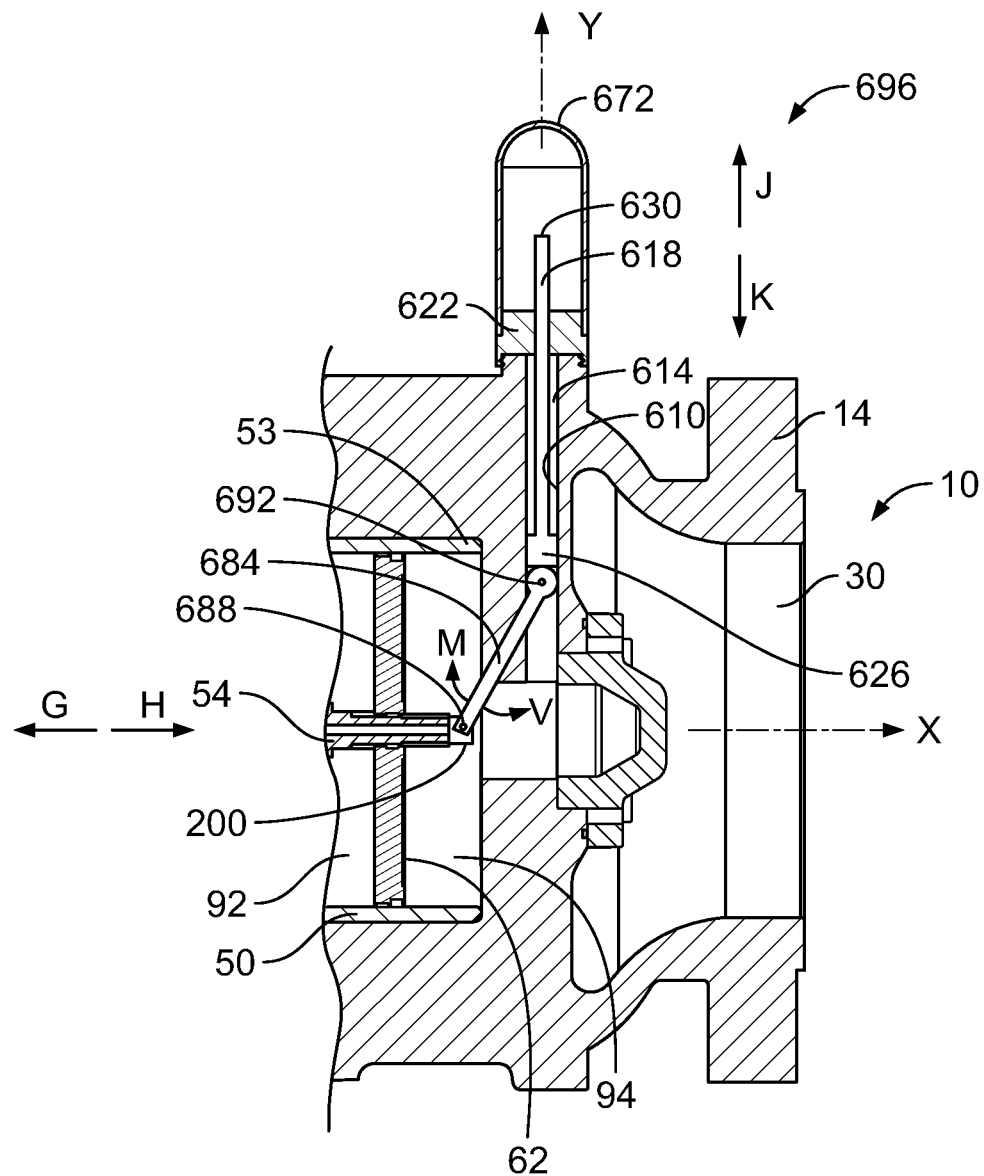
FIG. 18 is a partial, cross-sectional view of a fourth exemplary indicator assembly assembled in accordance with the teachings of the present disclosure, and disposed in the regulator of FIG. 1.

FIG. 18 illustrates a fourth exemplary indicator assembly 696 constructed according to the teachings of the present disclosure. The fourth exemplary indicator assembly 696 may replace the first exemplary indicator assembly 96 to operate with the regulator 10 of FIGS. 1-10B. The fourth exemplary indicator assembly 696 is similar to the first exemplary indicator assembly 96 discussed above, except the fourth exemplary indicator assembly 696 includes a rigid arm 684 connecting the stem 54 and a rod 614 to translate an axial movement of the stem 54 (e.g., in G and H directions) to an axial movement of the rod 614 (e.g., J and K directions). Elements of the fourth exemplary indicator assembly 696 which are similar to the elements of the first exemplary indicator assembly 96 are designated by the same reference numeral, incremented by 300. A description of many of these elements is abbreviated or even eliminated in the interest of brevity.

As shown in FIG. 18, the arm 684 has a first end 688 hingedly coupled to the second end 200 of the stem 54 and a second end 692 hingedly coupled to a first end 626 of the rod 614. Similar to the third exemplary indicator assembly 596, the rod 614 of the fourth exemplary indicator assembly 696 is integrally formed with the indicator 618. The arm 685 is a rigid member that translates axial movement of the stem 54 to axial movement of the rod 614. When the regulator 10 opens, the stem 54 pushes the first end 688 of the arm 684 in the H direction, which causes the second end 692 of the arm 684 to slide in the J direction within a bore 610 of the valve body 14. The second end 692 is hingedly coupled to the first end 626 of the rod 614 to permit the arm 684 to swivel in a V direction when the first end 688 moves in the H direction. When the regulator 10 closes, the stem 54 pulls the first end 688 of the arm 684 in the G direction, causing the second end 692 of the arm 684 to slide in the K direction within the bore 610 of the valve body 14. The arm 684 swivels in an M direction (opposite of the V direction) when the first end 688 of the arm 684 moves in the G direction. In another example, the indicator assembly 696 may include a second arm 684 hingedly coupled to the stem 54 and the rod 614.

Referring again to FIGS. 2 and 3, a method of assembling or installing the regulator 10 generally includes the steps of providing a single-cast valve body 14, assembling the actuator assembly 22, operatively coupling the control element 38 to the stem 54, aligning the actuator assembly 22 with the longitudinal axis X of the valve body 14, inserting the actuator assembly 22 into the bore 18 of the valve body 14 through the inlet 26, and securing the actuator assembly 22 to the valve body 14 by operatively coupling the inlet fitting 42 to the valve body 14. To assemble the actuator assembly 22, the first and second pistons 60, 62 and the first and second sleeve portions 50a, 50b are assembled to the stem 54. Specifically, the step of assembling the actuator assembly 22 includes sliding the second end 200 of the stem 54 through the aperture 89 of the second plate 72 and an aperture of the second piston 62 and sliding the first end 132 of the stem 54 through an aperture of the first piston 60 and the aperture 87 of the first plate 70. The first and second pistons 60, 62 are secured to the stem 54 as described above. The hub 130 of the control element 138 slides onto the first end 132 of the stem 54 and secured thereto. The cap 334 is secured to the second end 200 of the stem 54. The stem 54 and the components attached thereto are then fully inserted into the valve body 14 along with the cage 104, and all of the internal components are maintained in the valve body 14 by securing the inlet fitting 46 to the inlet 26.

The axial regulator 10 of the present disclosure advantageously simplifies regulator construction, manufacturing, maintenance, and assembly. To access the internal components of the disclosed regulator 10, an operator need only remove the inlet fitting 46 from the valve body 14 and slide the internal components out of the bore 18 through the inlet 26, which can be accomplished with the regulator 10 installed in a pipeline via the spacer 134 (FIG. 3). Assembly of the regulator 10 is also simplified as the internal components may be properly arranged prior to inserting the actuator assembly 22 into the valve body 14, thereby ensuring accurate alignment and placement of the components. Repair or replacement of the regulator components is also simplified, and access to the internal components may be achieved through the inlet 26 or, in some cases, a different access entry from the inlet 26 (e.g., the outlet 30). The removability of the internal components further enables the valve body 14 to be used with different types of internal components to provide different functionality. For example, different internal components may be inserted into the valve body 14 to enable the resulting device to function as a control valve or a slam-shut safety valve. The stem 54 of the regulator 10 also facilitates assembly. As discussed above, the stem 54 has different portions with varying outer diameters. When positioning the stem 54 relative to the sleeve 50 prior to inserting the internal components into the valve body 14, the operator need only match the apertures 87, 89 of the plates 70, 72 of the sleeve 50 with the corresponding thicknesses (i.e., segments) of the stem 54. Additionally, the operator may ensure that the passage 82 of the stem 54 fluidly connects the first and second downstream chambers 90, 94 and the pathway 76 of the sleeve 50 fluidly connects the first and second upstream chambers 88, 92 before disposing the actuator assembly 22 within the valve body 14.

The dual piston actuator assembly 22 affords the regulator 10 a compact design while providing adequate pressure sensing area. The pistons 60, 62 are arranged in series and the upstream chambers 88, 92 and the downstream chambers 90, 94 defined in part by each piston 60, 62 are in fluid communication. In this way, the dual piston actuator assembly 22 effectively provides a pressure sensing area similar to or even greater than that of a much larger single-piston actuator assembly, but in a relatively compact configuration. The size of the regulator 10 is further reduced through the axial insertion of the internal components, which permits the valve body 14 to be a single component rather than multiple components that are joined with large and heavy flanges. The compact size enables the regulator 10 to be designed for installation in large line sizes (e.g., a 12 inch line), whereas the size and weight of conventional axial regulators may limit the design of such regulators to smaller line sizes.

Additionally, the actuator assembly 22 is arranged such that the first and second pistons 60, 62 move in sealing engagement with the sleeve 50, and not an interior wall of the valve body 14. This simplifies the manufacturing process as only the sleeve 50, and not the valve body 14, needs to be machined to provide a smooth sliding interior surface 214. Accordingly, the larger valve body 14 can be manufactured using a lower-cost technique such as rough casting rather than machining. Thus, the dual piston actuator assembly 22 consequently reduces the manufacturing cost of the regulator 10.

The second, third, fourth, and fifth exemplary stems 236, 238, 240, and 242 also simplify manufacturing of the dual-piston actuator assembly 22. As described above, each of the second, third, fourth, and fifth exemplary stems 236, 238, 240, and 242 provides at least two passages to fluidly connect the first and third chambers 88, 92, and the second and fourth chambers 90, 94. Because each of the stems 236, 238, 240, and 242 provides a fluid connection between the first and third chambers 88, 92, the sleeve 50 of the regulator 10 may not include one or more pathways 76 extending through the cylindrical portion 66 of the sleeve 50 and the second disk 72. In this way, the regulator 10 would not require the same sealing mechanisms disposed in the bore 18 and between the valve body 14 and the sleeve 50 to effectively seal the pathway 76 of the actuator assembly 22. Rather, the control pressure is routed through the stem 236, 238, 240, 242 and not formed in the cylindrical wall 66 of the sleeve 50.

The indicator assemblies 96, 396, 496, 596, and 696 of the present disclosure may advantageously provide both accurate readings of the position of the regulator 10 and compact designs by converting the axial displacement of the stem 54 into an indicator movement that is conveniently disposed on the outside of the regulator 10.

Any of the components of the regulator 10 may be made using an additive manufacturing (AM) technique or process that builds three-dimensional objects by adding successive layers of material on a material or receiving surface. In particular, the first, second, third, fourth, and fifth stems 236, 238, 240, and 242 could be made using AM to achieve the staggered passage arrangement and even more complex passage arrangements. The AM technique may be performed by any suitable machine or combination of machines. The AM technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The AM technique may include any of several techniques or processes, such as, for example, a stereolithography ("SLA") process, digital light processing ("DLP"), a fused deposition modeling ("FDM") process, a multi-jet modeling ("MJM") process, a selective laser sintering ("SLS") process, a selective laser melting ("SLM") process, an electronic beam melting ("EBM") process, and an arc welding AM process. In some embodiments, the AM process may include a directed energy laser deposition process. Such a directed energy laser deposition process may be performed by a multi-axis computer-numerically-controlled ("CNC") lathe with directed energy laser deposition capabilities. Other manufacturing techniques may be utilized to create a stem for an axial regulator according to the present disclosure, and are not limited to the techniques herein.

The figures and description provided herein depict and describe preferred embodiments of an axial regulator for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for the axial regulator. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A fluid control device comprising:
   a valve body defining an inlet, an outlet, and a flow path connecting the inlet and the outlet;
   a control element movable along a longitudinal axis between the inlet and the outlet between a closed position, in which the control element engages a valve seat, and an open position, in which the control element is spaced away from the valve seat;
   a stem operatively coupled to the control element and axially aligned with the longitudinal axis; and
   an indicator assembly at least partially disposed in a bore of the valve body along an indicator axis that is non-parallel with the longitudinal axis, wherein the indicator assembly comprises:
a roller that is in direct contact with a conical cap that has a bore sized to receive an end of the stem;
a rod that is coupled to the roller;
an indicator that is coupled to the rod and that is extendable outside of the valve body; and
a spring that is disposed in the bore of the valve body and biases the rod toward the stem,
wherein the rod has a diameter that is larger than a diameter of the indicator, and
wherein movement of the stem along the longitudinal axis causes movement of the roller along the cap, thereby causing movement of the rod of the indicator assembly along or about the indicator axis to indicate a position of the control element when the control element is in the open position, the closed position, and a position between the open and closed positions.

2. The fluid control device of claim 1, wherein the indicator axis is perpendicular to the longitudinal axis.

3. The fluid control device of claim 1, wherein the indicator extends a first distance outside of the valve body when the control element is in the open position and extends a second distance outside of the valve body when the control element is in the closed position.

4. The fluid control device of claim 3, wherein the first distance is greater than the second distance.

5. The fluid control device of claim 1, wherein the cap has a wide first end and a narrow second end, the first end of the cap in contact with the rod when the control element is in the open position, and the second end of the cap in contact with the rod when the control element is in the closed position.

6. The fluid control device of claim 1, wherein the spring maintains contact between the rod and the cap carried by the stem.

7. The fluid control device of claim 1, wherein the indicator assembly further comprises a plug coupled to the valve body, the indicator slidably coupled to the plug, and wherein the spring is disposed against the plug in the bore of the valve body.

8. The fluid control device of claim 1, further comprising a guide sleeve disposed between the valve body and the rod to guide the rod.

9. A fluid control device, comprising:
a valve body defining an inlet, an outlet, and a flow path connecting the inlet and the outlet;
a control element movable along a longitudinal axis between the inlet and the outlet between a closed position, in which the control element engages a valve seat, and an open position, in which the control element is spaced away from the valve seat;
a stem operatively coupled to the control element and axially aligned with the longitudinal axis; and
an indicator assembly at least partially disposed in a bore of the valve body along an indicator axis that is non-parallel with the longitudinal axis, wherein movement of the stem along the longitudinal axis causes movement of a rod of the indicator assembly along or about the indicator axis to indicate a position of the control element when the control element is in the open position, the closed position, and a position between the open and closed positions;
wherein the indicator assembly includes a cord and a roller, the cord operatively coupleable to the stem at a first end of the cord and operatively coupled to the rod at a second end of the cord, the cord and the roller configured to translate an axial movement of the stem to an axial movement of the rod.

10. A fluid control device comprising:
a valve body defining an inlet, an outlet, and a flow path connecting the inlet and the outlet;
a control element movable along a longitudinal axis of the valve body between a closed position, in which the control element engages a valve seat, and an open position, in which the control element is spaced away from the valve seat;
a stem operatively coupled to the control element and axially aligned with the longitudinal axis;
an indicator assembly at least partially disposed in a bore of the valve body along an indicator axis that is non-parallel with the longitudinal axis,
wherein the indicator assembly includes:
a roller that is in direct contact with a conical cap that has a bore sized to receive an end of the stem; and
a rod that is coupled to the roller, wherein movement of the roller along the cap causes movement of the rod along the indicator axis to indicate a position of the control element relative to the valve seat; and
wherein the indicator assembly indicates a position of the control element when the control element is in the open position, the closed position, and a position between the open and closed positions.

11. The fluid control device of claim 10, wherein the indicator assembly includes a spring that biases the roller towards the conical cap.

12. The fluid control device of claim 11, wherein the spring biases the roller into contact with the conical cap.

13. The fluid control device of claim 11, wherein the cap has a wide first end and a narrow second end, the first end of the cap in contact with the rod when the control element is in the open position, and the second end of the cap in contact with the rod when the control element is in the closed position.

14. The fluid control device of claim 10, wherein the indicator assembly includes an indicator coupled to the rod, the indicator extends a first distance outside of the valve body when the control element is in the open position and extends a second distance outside of the valve body when the control element is in the closed position, wherein the first distance is greater than the second distance.

15. An indicator assembly for use with a fluid control device comprising:
a rod that is positioned at least partially within a body of the fluid control device along an indicator axis;
at least one feature that is operatively coupled to the rod and operatively coupleable to a stem of the fluid control device, wherein the indicator assembly is configured to convert the movement of the stem along a longitudinal axis that is non-parallel with the indicator axis into a movement along or about the indicator axis to indicate a position of a control element of the fluid control device;
wherein the at least one feature includes a cord and a roller, the cord operatively coupleable to the stem at a first end of the cord and operatively coupled to the rod at a second end of the cord, the cord and the roller configured to translate an axial movement of the stem to an axial movement of the rod.

16. The indicator assembly of claim 15, wherein the indicator axis is perpendicular to the longitudinal axis.

17. The indicator assembly of claim 15, further comprising an indicator that is coupled to the rod and that is extendable outside of the body.

18. The indicator assembly of claim 15, wherein the indicator extends a first distance outside of the body when the fluid control device is in an open position and extends a second distance outside of the body when the fluid control device is in a closed position, the first distance being greater than the second distance.

* * * * *

UNITED STATES PATENT AND TRADEMARK OFFICE
CERTIFICATE OF CORRECTION

| | |
|---|---|
| PATENT NO. | : 11,828,382 B2 |
| APPLICATION NO. | : 17/050798 |
| DATED | : November 28, 2023 |
| INVENTOR(S) | : Biao Zhou et al. |

It is certified that error appears in the above-identified patent and that said Letters Patent is hereby corrected as shown below:

On the Title Page

Under "Primary Examiner", Line 1, "Kenneeth Rinehart" should be -- Kenneth Reinhart --.

In the Specification

At Column 9, Line 31, "connected" should be -- connected. --.

Signed and Sealed this
Thirteenth Day of May, 2025

Coke Morgan Stewart
*Acting Director of the United States Patent and Trademark Office*